(12) United States Patent  (10) Patent No.: US 8,064,167 B2
Fujimoto et al.  (45) Date of Patent: Nov. 22, 2011

(54) MAGNETIC HEAD SUSPENSION

(75) Inventors: Yasuo Fujimoto, Kyoto (JP); Satoru Takasugi, Kyoto (JP)

(73) Assignee: Suncall Corporation, Kyoto-Fu (JP)

( * ) Notice: Subject to any disclaimer, the term of this patent is extended or adjusted under 35 U.S.C. 154(b) by 357 days.

(21) Appl. No.: 12/436,504

(22) Filed: May 6, 2009

(65) Prior Publication Data

US 2009/0279209 A1  Nov. 12, 2009

(30) Foreign Application Priority Data

May 9, 2008 (JP) ................................ 2008-123885
Apr. 27, 2009 (JP) ................................ 2009-108266

(51) Int. Cl.
*G11B 5/48* (2006.01)
(52) U.S. Cl. .................. 360/245; 360/245.2; 360/245.3; 360/245.4
(58) Field of Classification Search ................... 360/245, 360/245.2, 245.3, 245.4
See application file for complete search history.

(56) References Cited

U.S. PATENT DOCUMENTS

| | | | | |
|---|---|---|---|---|
| 6,341,415 B2 * | 1/2002 | Amemiya et al. | ......... | 29/603.06 |
| 6,847,591 B1 * | 1/2005 | Murakami et al. | ........... | 369/13.2 |
| 7,130,159 B2 * | 10/2006 | Shimizu et al. | ............ | 360/294.4 |
| 7,365,944 B2 * | 4/2008 | Fujimoto et al. | ........... | 360/244.2 |

FOREIGN PATENT DOCUMENTS

| | | |
|---|---|---|
| JP | 09-082052 | 3/1997 |
| JP | 11-039808 | 2/1999 |
| JP | 2004-348804 | 12/2004 |
| JP | 2005-174506 | 6/2005 |

* cited by examiner

*Primary Examiner* — Hoai V Ho
*Assistant Examiner* — Pablo Huerta
(74) *Attorney, Agent, or Firm* — Sterne, Kessler, Goldstein & Fox P.L.L.C.

(57) ABSTRACT

An elastic plate that is supported at both ends by a pair of supporting pieces of a supporting part functions as the load bending part. A portion of a load beam base plate that is positioned on a distal end side from a load bending center line of the elastic plate includes a parallel region that is fixed to the elastic plate, an intermediate region that extends to a distal end side through a proximal-side bending line along a suspension widthwise direction, and a distal region that extends to a distal end side through a distal-side bending line and is formed with a dimple with which a head-mounting region of a flexure part is brought into contact. The distal-side bending line is positioned in the vicinity of an intermediate point between the load bending center line and the dimple in a suspension lengthwise direction.

8 Claims, 14 Drawing Sheets

MAGNETIC HEAD SUSPENSION

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

In recent years, data storage devices for reading and/or writing data from and to recording mediums through a magnetic head slider have been widely used in mobile devices such as notebook-type personal computers and portable music players and, along therewith, these data storage devices have been required to have a higher impact resistance.

More specifically, in such a case where the data storage device in operation is dropped on to the ground, the magnetic head suspension is desired to prevent the magnetic head slider from damaging a disk surface as much as possible.

For example, in a case where the data storage device in operation is applied with an impact force having such a direction that presses the magnetic head slider toward the disk surface, an air film existing between the magnetic head slider and the disk surface prevents to some extent the magnetic head slider from hitting the disk surface.

However, on the other hand, in a case where the data storage device in operation is applied with an impact force having such a direction that presses the magnetic head slider away from the disk surface and having a strength exceeding a predetermined level, the magnetic head slider jumps away from the disk surface and then swings back to hit the disk surface, which will result in damages to the disk surface as well as to the magnetic head slider.

Accordingly, in order to improve the impact resistance of the data storage device, it is required to prevent the jumping motion of the magnetic head slider as much as possible when the impact force is applied from the outside, that is, it is required to raise as much as possible acceleration (critical acceleration) of the impact force that causes the jumping motion of the magnetic head slider.

The magnetic head slider is supported by the magnetic head suspension that is mounted to the data storage device.

More specifically, the magnetic head suspension includes a load bending part that generates a load to press the magnetic head slider toward the disk surface, a load beam part that transmits the load to the magnetic head slider, a supporting part that supports the load beam part with the load bending part interposed between the supporting part and the load beam part, and a flexure part that has a head-mounting region to which the magnetic head slider is mounted and that is welded to the load beam part.

The critical acceleration can be increased by, for example, increasing the load that is generated by the load bending part.

However, the load needs to be set within a range appropriate for controlling the height by which the magnetic head slider flies above the disk surface. Accordingly, there is obviously a limitation in the method of increasing the load to increase the critical acceleration.

It is also possible to increase the critical acceleration by reduction in weight of the load beam part so as to reduce an inertial force that is applied to the load beam part upon application of an impact force.

However, such reduction in weight of the load beam part requires reduction in thickness of the load beam part or provision of a hole in the load beam part, which will result in deterioration in rigidity of the load beam part and therefore deterioration in vibration property as well as in load/unload property.

There has been proposed still another configuration to inhibit the jumping motion of the magnetic head slider upon application of an impact force. In such a configuration, the load beam part is provided with an extension portion that extends toward a base end beyond a portion joined to the load bending part (refer to Japanese Unexamined Patent Publications Nos. 09-082052, 11-039808, 2004-348804, 2005-174506, and the like).

The conventional structure described in these the patent documents is configured so as to make a mass of a portion of the load beam part which is positioned on a base-end side in a suspension lengthwise direction from the load bending part to be as equal as possible to a mass of a portion thereof which is positioned on a tip-end side of the suspension lengthwise direction from the load bending part so that the jumping motion of the magnetic head slider is suppressed at a time when the external impulsive force is applied. The structure is advantageous in causing no deterioration in rigidity of the load beam part.

However, in the magnetic head suspension described in these patent documents, the load beam part is joined to a free end of the load bending part that is supported by the supporting part in a cantilevered manner. Accordingly, in this configuration, a support point of the load bending part (that is, a joint point between the load beam part and the load bending part) is remarkably fluctuated in a direction perpendicular to the disk surface upon application of an external impact force.

Therefore, although the magnetic head suspension described in these patent documents does not cause deterioration in rigidity of the load beam part, it is incapable of allowing the critical acceleration to be sufficiently increased.

The magnetic head suspension is a member that rapidly moves the magnetic head slider in a radial direction (a seek direction) above the recording medium such as a hard disk in accordance with driving of an actuator so as to accurately position the magnetic head slider on a target track. Thus, the magnetic head suspension is also desired to accurately control its vibration property, particularly a vibration property in the seek direction in parallel with the disk surface.

More specifically, the magnetic head suspension needs to have a resonant frequency in the SWAY mode that is equal to none of the resonant frequencies of the magnetic head suspension in any other modes and the resonant frequencies of any components of the data storage device other than the suspension.

Furthermore, the magnetic head suspension is desired to effectively prevent or reduce displacement of the magnetic head slider in the seek direction due to vibration of the magnetic head suspension in the torsion mode.

SUMMARY OF THE INVENTION

The present invention is made in view of the conventional techniques and aims to provide a magnetic head suspension capable of enhancing impact resistance as well as accurately controlling vibration property in seek direction.

In order to achieve the aim, the present invention provide a magnetic head suspension including a load bending part that generates a load for pressing a magnetic head slider toward a disk surface, a load beam part that transmits the load to the magnetic head slider, a supporting part that supports the load beam part through the load bending part, and a flexure part that includes a head-mounting region for supporting the magnetic head slider and that is fixed to the load beam part. The supporting part include a main body region, and a pair of supporting pieces that extend from both ends of the main body region in a suspension widthwise direction toward a distal end side of the suspension so as to define a concave region between the pair of supporting pieces that is opened toward the distal end side of the suspension, the pair of supporting pieces being symmetrical to each other about a longitudinal center line of the magnetic head suspension. The load bending part includes an elastic plate that is supported at both ends by the pair of supporting pieces. The elastic plate includes first and second supporting-part contacting regions that are brought into contact with and fixed to the pair of supporting pieces, respectively, a load-beam-part contacting region that is fixed to the load beam part within the concave region, and first and second extending regions that connect the load-beam-part contacting region with the first and second supporting-part contacting regions, respectively, the first and second extending regions being elastically twisted around a load bending center line along the suspension widthwise direction so that the elastic plate functions as the load bending part. The load beam part is formed by a load beam base plate, a portion of the load beam base plate that is positioned on a distal end side from the load bending center line including a parallel region that extends substantially in parallel with the load-beam-part contacting region and directly or indirectly fixed to thereto, an intermediate region that extends from the parallel region toward a distal end side of the suspension through a proximal-side bending line along the suspension widthwise direction, and a distal region that extends form the intermediate region toward a distal end side of the suspension through a distal-side bending line along the suspension widthwise direction and that includes a dimple with which the head-mounting region is brought into contact. The distal-side bending line is positioned in the vicinity of an intermediate point between the load bending center line and the dimple in a suspension lengthwise direction.

In the magnetic head suspension according to the present invention, the first and second supporting-part contacting region of the elastic plate are brought into contact with and fixed to the pair of supporting pieces that extend to the distal end side of the suspension from the both ends of the main body region of the supporting part in the suspension widthwise direction. The load beam part and the load-beam-part contacting region of the elastic plate are fixed to each other in a state of being brought into contact with each other. The first and second extending regions of the elastic plate between the first and second supporting-part contacting regions and the load-beam-part contacting region are elastically twisted around the load bending center line along the suspension widthwise direction so as to generate the load for pressing the magnetic head slider toward the disk surface.

The portion, which is positioned on a distal end side from the load bending center line, of the load beam base plate forming the load beam part is bent at the proximal-side bending line and the distal-side bending line that are along the suspension widthwise direction, so that the parallel region and the intermediate region are divided by the proximal-side bending line and the intermediate region and the distal region are divided by the distal-side bending line. The parallel region is directly or indirectly fixed to the load-beam-part contacting region of the elastic plate, and the distal region is provided with the dimple with which the head-mounting region of the flexure part is brought into contact.

The distal-side bending line is positioned in the vicinity of an intermediate point between the load bending center line and the dimple in a suspension lengthwise direction.

The magnetic head suspension according to the present invention makes it possible to effectively prevent a joint point between the load beam part and the load bending part from moving in a direction perpendicular to the disk surface upon application of an impact force, since the elastic plate configured so that the first and second supporting-part contacting regions positioned on both sides in the suspension widthwise direction are supported by the supporting part is elastically twisted around the load bending center line at the first and second extending regions between the first and second supporting-part contacting regions and the load-beam contacting region so as to function as the load bending part. Accordingly, the magnetic head suspension could improve impact resistance.

Further, the magnetic head suspension makes it possible to enhance rigidity of the load beam base plate so that resonant frequency of the suspension in the SWAY mode is increased, since the load beam base plate is bent at the two positions of the proximal-side bending line and the distal-side bending line that are positioned on a distal end side from the load being center line. Furthermore, by adjusting bending angles at the proximal-side bending line and the distal-side bending line, it is possible to adjust displacement amount of the magnetic head slider in the seek direction at plural torsion modes, thereby enhancing vibration property of the magnetic head suspension in the seek direction.

Further, since the distal-side bending line is positioned in the vicinity of the intermediate point between the load bending center line and the dimple in the suspension lengthwise direction, it is possible to effectively change the position of center of gravity of the load beam base plate along z direction perpendicular to the disk surface without increasing the bending angle oat the distal-side bending line. Accordingly, it is possible to adjust the center of torsion motion of the load beam part in vibration mode to a desired position with keeping the bending angle at the distal-side bending line small.

In a first aspect, the elastic plate is fixed to surfaces of the supporting pieces that are positioned on a side facing the disk surface, and the load beam base plate is fixed to a surface of the elastic plate that is positioned on a side opposite from the disk surface. The load beam base plate is bent at the proximal-side bending line so that the intermediate region comes closer to the disk surface as a distance to its distal end is reduced with the parallel region as a reference, and is also bent at the distal-side bending line so that the distal region moves away from the disk surface as a distance to its distal end is reduced with the intermediate region as a reference.

In the first aspect, the elastic plate is positioned on a side of the supporting pieces that is close to the disk surface, the load beam base plate is positioned on a side of the elastic plate that is opposite from the disk surface. The intermediate region of the load beam base plate is bent at the proximal-side bending line with respect to the parallel region so as to be come closer to the disk surface as the distance to the distal end is reduced, and the distal region of the load beam base plate is bent at the distal bending line with respect to the intermediate region so as to be spaced apart from the disk surface as the distance to the distal end is reduced. That is, a portion of the load beam base plate at which the proximal-side bending line is positioned is formed into a convex shape protruding in a direction away from the disk surface, and a portion thereof at which the distal-side bending line is positioned is formed into a convex shape protruding in a direction towards the disk surface.

The configuration makes it possible to easily dispose the distal side of the load beam base plate substantially in parallel with the disk surface and closer to the disk surface than the parallel region, while allowing the proximal side of the load beam base plate to be attached to a position that is relatively away from the disk surface.

The magnetic head suspension preferably may include an equilibrating weight part fixed to the load beam base plate in such a manner that at least a part of the equilibrating weight part is positioned within the concave region in planar view.

In this case, the equilibrating weight part is fixed to the load beam base plate. At least a part of the equilibrating weight part is positioned within the concave region of the supporting part.

The configuration makes it possible to make a center of gravity of a movable region of the magnetic head suspension (a region except for the supporting part) come closer to the load bending center line as much as possible. Therefore, it is possible to suppress as much as possible the vibration around the load bending center line even if external impact force is applied, thereby enhancing impact resistance.

In a second aspect, the magnetic head suspension includes an equilibrating weight part fixed to the load beam base plate in such a manner that at least a part of the equilibrating weight part is positioned within the concave region in planar view.

The elastic plate is fixed to surfaces of the supporting pieces that are positioned on a side close to the disk surface, the equilibrating weight part is fixed to a surface of the elastic plate that is positioned on a side close to the disk surface, and the load beam base plate is fixed to a surface of the equilibrating weight part that is positioned on a side close to the disk surface.

The load beam base plate is bent at the proximal-side bending line so that the intermediate region moves away from the disk surface as a distance to its distal end is reduced with the parallel region as a reference, and is also bent at the distal-side bending line so that the distal region is come closer to the disk surface as a distance to its distal end is reduced with the intermediate region as a reference.

In the second aspect, the elastic plate is positioned on a side of the supporting pieces that is close to the disk surface, the equilibrating weight part is positioned on a side of the elastic plate that is close to the disk surface, and the load beam base plate is positioned on a side of the equilibrating weight that is close to the disk surface. The intermediate region of the load beam base plate is bent at the proximal-side bending line with respect to the parallel region so as to be spaces apart from the disk surface as the distance to the distal end is reduced, and the distal region of the load beam base plate is bent at the distal bending line with respect to the intermediate region so as to be come closer to the disk surface as the distance to the distal end is reduced. That is, a portion of the load beam base plate at which the proximal-side bending line is positioned is formed into a convex shape protruding in a direction towards the disk surface, and a portion thereof at which the distal-side bending line is positioned is formed into a convex shape protruding in a direction away from the disk surface.

The configuration makes it possible to easily dispose the distal side of the load beam base plate substantially in parallel with the disk surface and away from the disk surface by a predetermined length, while allowing the proximal side of the load beam base plate to be attached to a position that is relatively close to the disk surface.

In a preferable embodiment, the equilibrating weight part includes a bend portion that is along the suspension width direction, and is bent at the bend portion such that a region that is positioned on a proximal side from the bend portion moves away from the disk surface as a distance to a proximal end is reduced.

The configuration makes it possible to effectively prevent the equilibrating weight part from coming into contact with disk surface even if the equilibrating weight part is swung around the load bending center line upon application of impact force from the outside.

In a preferable embodiment, the flexure base plate that forms the flexure part may include a load-beam-part contacting region that is brought into contact with and fixed to the load beam base plate, a pair of supporting pieces that extend toward a distal end side from the load-beam-part contacting region, the head-mounting region which is connected to free ends of the pair of supporting pieces and to which the magnetic head slider is mounted, and a pair of wider regions that extend respectively from the load-beam-part contacting region outwards in the suspension widthwise direction beyond the load beam base plate. The distal-side bending line and the proximal-side bending line are arranged so as not to be overlapped with the pair of the wider regions with respect to positions along the suspension lengthwise direction.

The configuration makes it possible to enhance rigidity of the load beam part since the pair of wider regions extend outward in the suspension widthwise direction beyond the load beam base plate.

Further, since the distal-side bending line and the proximal-side bending line of the load beam base plate are arranged so as not to be overlapped with the pair of the wider regions with respect to positions along the suspension lengthwise direction, it is possible to stably perform bending process of the load beam base plate at the distal-side bending line and the proximal-side bending line while enhancing rigidity of the load beam part thanks to the pair of wider regions.

In a preferable embodiment, the load beam base plate includes a plate-like main body portion that is symmetrical with the longitudinal center line of the magnetic head suspension as a reference, and flange portions that are arranged at both edges of the main body portion in the suspension widthwise direction. Free ends of the pair of flange portions are formed with notches at the same positions as the distal-side bending line and the proximal-side bending line in the suspension lengthwise direction.

The configuration makes it possible to enhance rigidity of the load beam part thanks to the pair of flange portions. Further, since the pair of flange portions are formed with the notches so as to be opened to the free ends at the same positions as the distal-side bending line and the proximal-side bending line in the suspension lengthwise direction, it is possible to stably perform bending process of the load beam base plate at the distal-side bending line and the proximal-side bending line while enhancing rigidity of the load beam part thanks to the pair of flange portions.

In a preferable embodiment, the load beam base plate includes a plate-like main body portion that is symmetrical with the longitudinal center line of the magnetic head suspension as a reference, and flange portions that are arranged at both edges of the main body portion in the suspension widthwise direction. The load beam base plate is formed with through-holes at the same positions as the distal-side bending line and the proximal-side bending line in the suspension lengthwise direction, the through-holes being across boundaries between the main body portion and the pair of flange portions.

The configuration makes it possible to enhance rigidity of the load beam part thanks to the pair of flange portions. Further, since the load beam base part is formed with the through-holes that are poisoned same as the distal-side bending line and the proximal-side bending line in the suspension lengthwise direction and that are across boundaries between the main body portion and the pair of flange portions, it is possible to stably perform bending process of the load beam

DETAILED DESCRIPTION OF THE PREFERRED EMBODIMENTS

First Embodiment

Hereinafter, one preferred embodiment of a magnetic head suspension according to the present invention will be described, with reference to the attached drawings.

FIGS. 1A and 1B are a top view (a view from a side opposite from a disk surface) and a bottom view (a view as viewed from a side close to the disk surface) of a magnetic head suspension 1A according to the present embodiment, respectively. FIG. 2 is an enlarged view of a part II in FIG. 1B.

Figure 1:
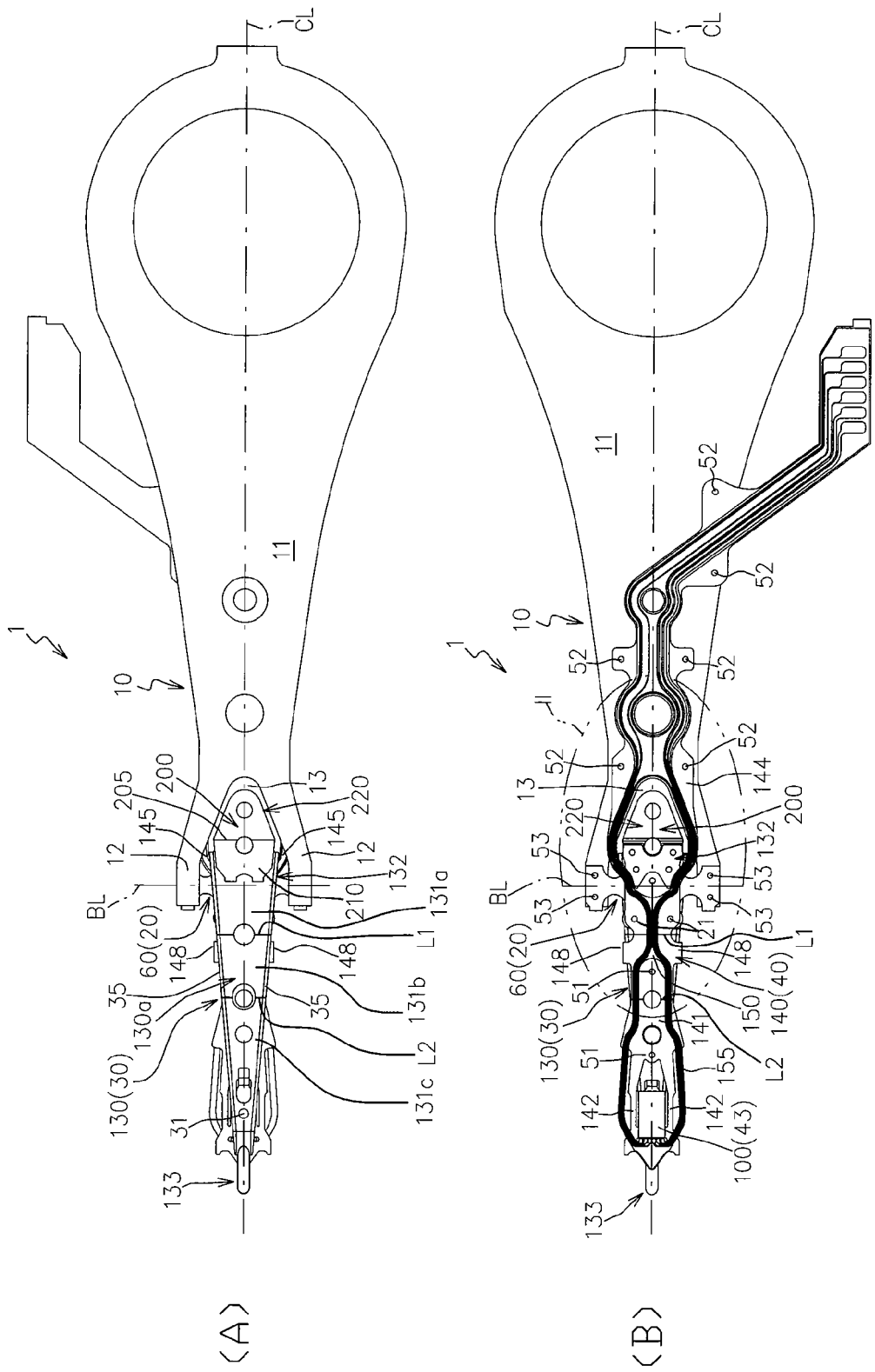
FIGS. 1A and 1B are a top view (a plan view as viewed from a side opposite from a disk surface) and a bottom of a magnetic head suspension according to a first embodiment of the present invention, respectively.
Figure 2:
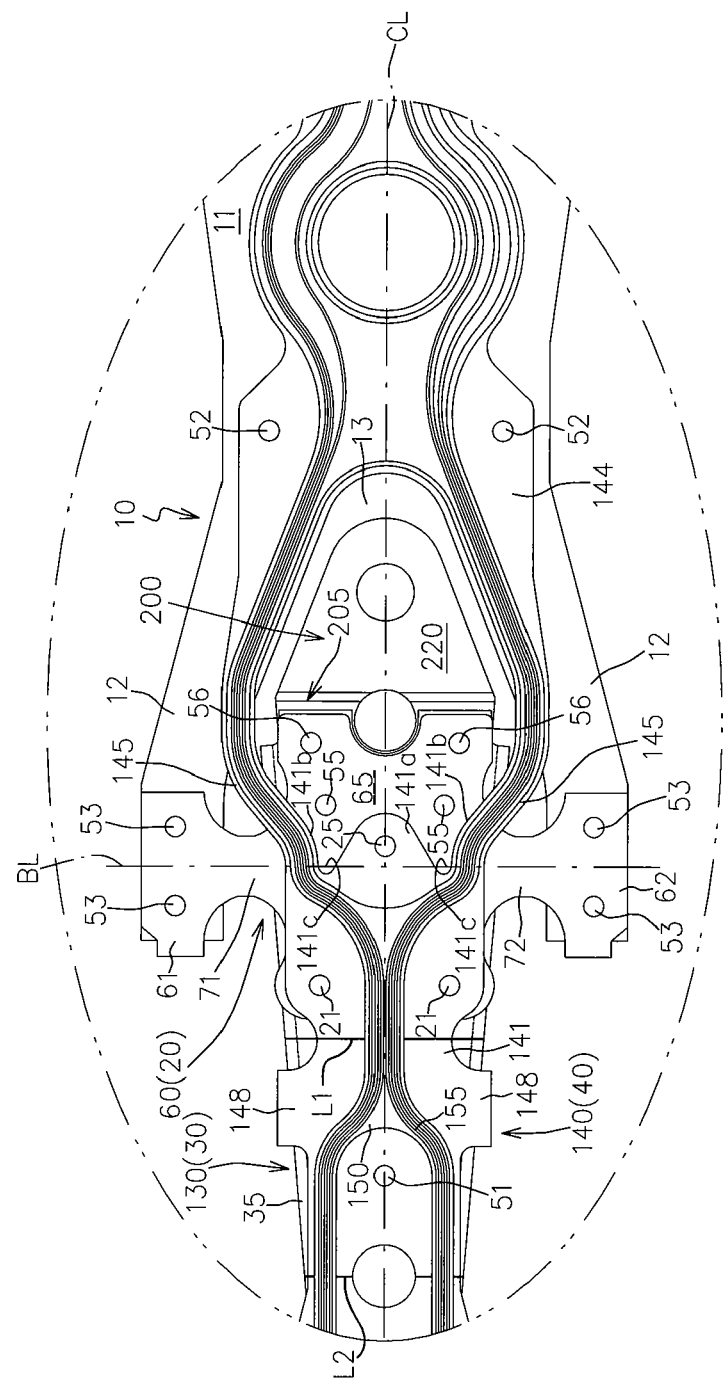
FIG. 2 is an enlarged view of a part II in FIG. 2.

As shown in FIGS. 1 and 2, the magnetic head suspension 1A according to the present embodiment includes a load bending part 20 which generates a load for pressing a magnetic head slider 100 toward the disk surface, a load beam part 30 which transmits the load to the magnetic head slider 100, a supporting part 10 which supports the load beam part 30 through the load bending part 20, and a flexure portion 40 which has a head-mounting region 43 and fixed to the load beam part 30 by welding, boding or the like.

The supporting part 10 is a member for supporting the load beam part 30 through the load bending part 20, and is made to have relatively high rigidity.

In the present embodiment, the supporting part 10 is embodied by an arm having a proximal end connected to a rotational center of an actuator, as shown in FIGS. 1A and 1B. Instead of this, the supporting part 10 could be in form of a base plate including a boss portion joined by a swage processing to a distal end of a carriage arm.

The supporting part 10 may be preferably formed of a stainless plate having a thickness of 0.1 mm to 0.8 mm.

As shown in FIGS. 1 and 2, in the present embodiment, the supporting part 10 has a pair of supporting pieces 12 that extended from both ends in a suspension widthwise direction toward a distal end of the suspension 1, so that there is formed in a center in the suspension widthwise direction a concave region 13 which is opened to the distal end of the suspension 1.

More specifically, the supporting part 10 has a plate-like main body region 11 that has a proximal end connected directly or indirectly to the actuator, and the pair of supporting pieces 12 that extend from the both ends in the suspension widthwise direction of a distal end of the main body region 11 toward the distal end side of the suspension 1, wherein the concave region 13 is formed between the pair of supporting pieces 12.

The load beam part 30 is a member for transmitting the load generated by the load bending part 20 to the magnetic head slider 100 as described above and, therefore, is required to have a predetermined rigidity. The load beam part 30 is formed by a load beam base plate 130 shaped into a predetermined shape.

It is possible to secure the rigidity of the load beam part 30 by having a thickness of the load beam base plate greater than those of a bellow mentioned elastic plate 60 that forms the load bending part 20 and a flexure base plate 140 that forms the flexure part 40. In addition to or in place of the configuration, it is also possible to secure the rigidity of the load beam part 30 while having the thickness of the load beam base plate 130 substantially same as that of the flexure base plate 140 by providing the load beam base plate 140 with flange portions 35 at its opposite sides in the suspension widthwise direction As shown in FIG. 1, in the present embodiment, the load beam base plate 130 has a plate-like main body portion 130a that is symmetrical with a longitudinal center line CL of the magnetic head suspension as a reference, and flange portions 35 that are arranged at both edges of the main body portion 130a in the suspension widthwise direction. The arrangement of the flange portions 35 at both sides of the load beam base plate 130 makes it possible to reduce the thickness of the load beam base plate 130 as much as possible while securing the rigidity of the load beam part 30.

The load beam base plate 130 may be, for example, a stainless plate having a thickness of 0.015 mm to 0.1 mm.

The load beam part 30 is provided, at its tip-end portion, with a dimple 31 that has a protruding shape.

The dimple 31 is protruded by, for example, about 0.04 mm to 0.08 mm, in a direction towards the disk surface. The dimple 31 is brought into contact with a back surface (a surface opposite from the disk surface) of the head-mounting region 43 of the flexure part 40, so that the load is transmitted to the head-mounting region 43 of the flexure part 40 through the dimple 31.

The flexure part 40 is a member for supporting the magnetic head slider 100.

In the present embodiment, as shown in FIGS. 1 and 2, the flexure part 40 is of a integrated-wire type integrally including a flexure base plate 140, an insulating layer 150 laminated on the flexure base plate 140 and a conductive layer 155 laminated on the insulating layer 150. The flexure base plate 140 includes the head mounting reason 43 for supporting the magnetic head slider 100 and is fixed to the load beam base plate 130 by welding, bonding or the like in a state of being brought into contact therewith.

The flexure base plate 140 may be, for example, a stainless plate having a thickness of 0.015 mm to 0.025 mm.

More specifically, as shown in FIGS. 1(b) and 2, the flexure base plate 140 includes a load-beam-part contacting region 141 that is brought into contact with the load beam base plate 130 and is welded thereto at a appropriate welding points 51, a pair of supporting pieces 142 that extend toward a distal end side from the load-beam-part contacting region 141, and a head-mounting region 43 which is connected to free ends of the pair of supporting pieces 142 and to which the magnetic head slider 100 is mounted.

The head-mounting region 43 supports the magnetic head slider 100 at a facing surface that faces the disk surface.

As described above, the dimple 31 is brought into contact with a back surface of the head-mounting region 43, which allows the head-mounting region 43 to sway flexibly in a roll direction and in a pitch direction, with the dimple 31 functioning as a fulcrum.

In the present embodiment, as shown in FIGS. 1(b) and 2, the flexure base plate 140 further includes a supporting-part contacting region 144 that is brought into contact with the supporting part 10 and that is fixed thereto by welding, bonding or the like, and a pair of bridge region 145 that extend from both sides of the load-beam-part contacting region 141 in a suspension widthwise direction toward a proximal end side to be connected to the supporting-part contacting region 144. In the present embodiment, the supporting-part contacting region 144 is brought into contact with the supporting part 10 and is welded thereto at appropriate welding points 52.

As shown in FIGS. 1 and 2, the pair of bridge regions 145 extend within the concave region 13 so as to connect the load-beam-part contacting region 141 and the supporting-part contacting region 144, and are symmetrical to each other with the longitudinal center line CL of the magnetic head suspension 1 as a reference.

As shown in FIGS. 1 and 2, the magnetic head suspension 1 further includes an elastic plate 60 that is supported at its both ends by the pair of supporting pieces 11 of the supporting part 10, and the elastic plate 60 functions as the load bending part 20.

Figure 3:
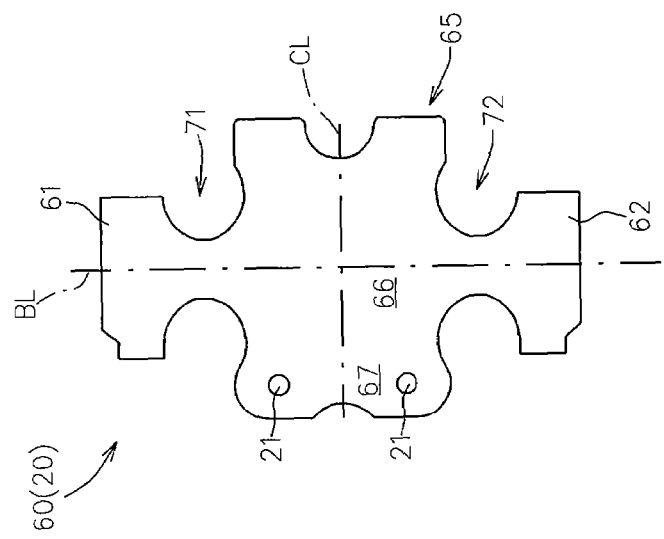
FIG. 3 is an enlarged bottom view of an elastic plate in the magnetic head suspension according to the first embodiment. 60.

FIG. 3 is an enlarged bottom view of the elastic plate 60.

As shown in FIGS. 2 and 3, the elastic plate 60 includes first and second supporting-part contacting regions 61, 62 that are brought into contact with the pair of supporting pieces 12, respectively and that are welded thereto at appropriate welding points 53 (see FIG. 1(b)), a load-beam-part contacting region 65 that is fixed to the load beam part 30 by welding, boding or the like in a state of being brought into contact with thereto within the concave region 13, and first and second extending regions 71, 72 that connect the load-beam-part contacting region 65 with the first and second supporting-part contacting regions 61, 62, respectively.

In the elastic plate 60, the load-beam-part contacting region 65 includes a central region 66 arranged at the same position as the first and second extending regions 71, 72 with respect to the lengthwise direction of the magnetic head suspension, and distal region extending toward a distal end side from the central region 66.

In the present embodiment, the load-beam-part contacting region 65 is welded to the load beam part 30 at a pair of welding points 21 positioned within the distal region 67 in a state of being brought into contact therewith.

In the present embodiment, the elastic plate 60 is welded at the pair of welding points 21 positioned in the distal region 67 of the load-beam-part contacting region 65 to the flexure base plate 140 as well as to the load beam base plate 130.

The elastic plate 60 is configured so that the first and second extending regions 71, 72 are elastically twisted around a load bending center line BL along the widthwise direction of the magnetic head suspension 1 to generate the load.

More specifically, the first and second extending regions 71,72 are elastically twisted around the load bending center line BL when the magnetic head slider 100 is floated above the disk surface in accordance with the air pressure caused by the rotation of the disk surface. A retained elasticity of the elastic plate 60 that is generated by such elastic twisting motion functions as a pressing load that presses the magnetic head slider 100 toward the disk surface. The pressing load is equilibrated with the air pressure, so that the magnetic head suspension 1 is in the operating condition.

The elastic plate 60 is made from a member capable of performing elastically twisting movement around the load bending center line BL. The elastic plate 60 may be preferably formed from, for example, a stainless-steel plate having a thickness in the range of about 0.02 mm to 0.1 mm.

In advance of mounting the magnetic head suspension 1 in the data storage device, the first and second extending regions 71 and 72 of the elastic plate 60 can be preliminarily twisted around the load bending center line BL so that a distal end and a proximal end of the load-beam-part contacting region 65 in the suspension lengthwise direction come close to and separate from the disk surface, respectively, in a state where the first and second supporting-part contacting regions 61 and 62 are retained by the pair of supporting pieces 12 so as to be substantially parallel to the disk surface.

In such a preferable configuration, the magnetic head suspension 1 is mounted in the data storage device with the pair of first and second extending regions 71 and 72 being twisted back around the load bending center line BL to generate the predetermined pressing load. At the time of the operation (loaded) condition of the magnetic head suspension in which the magnetic head slider 100 is subjected to an air pressure generated by rotation of the disk in a state of being positioned above the disk surface, the pressing load, which is generated by elastic twist back deformation of the pair of first and second extending regions 71 and 72 upon application of the air pressure, counterbalances with the air pressure so that the magnetic head slider 100 is floated above the disk surface. Therefore, the configuration makes it possible to stably control the pressing load.

The load-beam-part contacting region 65 of the elastic plate 60 is provided with the distal region 67 that extends from the first and second extending regions 71 and 72 toward the distal end side in the suspension lengthwise direction, and the distal region 67 is welded to the load beam base plate 130 as well as to the flexure base plate 140 at least at the pair of welding points 21. This configuration more effectively improves rigidity in the seek direction of a portion of the magnetic head suspension 1 that is positioned on a distal end side from the load bending center line BL.

In the present embodiment, as shown in FIGS. 1A, 1B, and 2, the elastic plate 60 is placed on a side of the supporting part 10 that is petitioned close to the disk surface.

More specifically, the supporting-part contacting regions 61 and 62 are fixed respectively to lower surfaces of the pair of supporting pieces 12 (welded and fixed at welding points 53 in the present embodiment) that are positioned on a side close to the disk surface in a state of being brought into contact therewith.

The load beam base plate 130 is placed on the surface of the elastic plate 60 that is positioned on a side opposite from the disk surface as shown in FIG. 1A, while the flexure base plate 140 is placed on the surface of the load beam base plate 130 and the elastic plate 60 that are positioned on a side close to the disk surface as shown in FIGS. 1B and 2.

In other words, the lower surface (the surface on a side close to the disk surface) of the load beam base plate 130 is brought into contact with the upper surface (the surface on a side opposite from the disk surface) of the load-beam-part contacting region 65 of the elastic plate 60.

On the other hand, the upper surface of the flexure base plate 140 is brought into contact with the lower surface (the surface on a side close to the disk surface) of the load beam base plate 130 in a region where the elastic plate 60 does not exist, while being brought into contact with the lower surface (the surface on a side close to the disk surface) of the elastic plate 60 in the remaining region where the elastic plate 60 exists.

As described above, in the magnetic head suspension 1 according to the present embodiment, the elastic plate 60 that is supported at the both ends thereof functions as the load bending part 20, thereby exerting the following effects.

A load bending part in a conventional magnetic head suspension is formed by a spring that is supported in a cantilevered manner so as to have a proximal end supported by a supporting part such as an arm and a free end supporting a load beam part.

In this conventional configuration, upon application of an external impact force, a support point of the load beam part (namely, a joint point between the load beam part and the load bending part) is remarkably fluctuated in a direction perpendicular to the disk surface. Accordingly, even in a case where the load beam part is reduced in weight with no deterioration in rigidity thereof, and/or a case where the distal end side and the proximal end side of the load beam part are counterbalanced in weight with each other with respect to the support point of the load beam part, it is incapable of sufficiently inhibiting a magnetic head slider thereof from jumping in a direction perpendicular to the disk surface upon application of the impact force.

To the contrary, in the magnetic head suspension 1 according to the present embodiment, the elastic plate 60, which is supported at the both ends thereof, functions as the load bending part 20.

This configuration effectively prevents the support point of the load beam part 30 (namely, the joint point between the load beam base plate 130 and the elastic plate 60) from being fluctuated in a direction perpendicular to the disk surface upon application of an external impact force. Therefore, the jumping motion of the magnetic head slider 100 is inhibited upon application of an impact force to significantly improve impact resistance of the magnetic head suspension 1.

A distal-end edge and a proximal-end edge of the first and second extending regions 71 and 72 are preferably formed to have concave shapes that are opened respectively toward the distal end side and the proximal end side in planar view. As shown in FIG. 3, in the present embodiment, the edges of the first and second extending regions 71 and 72 on the distal end side and the proximal end side are formed in curved shapes that are opened respectively toward the distal end side and the proximal end side in planar view.

This configuration allows the first and second extending regions 71 and 72 to be easily deformed by being elastically twisted around the load bending center line BL. Therefore, reduction of variation in load (stabilization of the load) as well as reduction of variation in spring constant (stabilization of the spring constant) could be achieved.

Further, as shown in FIGS. 1A, 1B, 2, and 3, in the magnetic head suspension 1 according to the present embodiment, the portion of the load-beam-part contacting region 65 in the elastic plate 60 that is positioned on a distal end side from the load bending center line BL is welded to the load beam base plate 130 as well as to the flexure base plate 140 at least at the pair of welding points 21 that are positioned symmetrically to each other about the longitudinal center line CL. Such a configuration improves rigidity in the seek direction (the direction in parallel with the disk surface) of the portion of the magnetic head suspension 1 that is positioned on a distal end side from the load bending center line BL, and also increases the resonant frequency in an oscillation mode (the SWAY mode), which is a main resonance mode, with no deterioration in impact resistance thereof.

More specifically, it may be possible to improve rigidity in the seek direction of the portion of the magnetic head suspension 1 that is positioned on a distal end side from the load bending center line BL. However, this configuration involves increase in weight of the load beam part 30, resulting in deterioration of impact resistance thereof.

To the contrary, in the present embodiment, the portion of the load-beam-part contacting region 65 in the elastic plate 60 that is positioned on a distal end side from the load bending center line BL is welded to both the load beam base plate 130 and the flexure base plate 140, at least at the pair of welding points 21 that are positioned symmetrically to each other about the longitudinal center line CL.

In this configuration, the flexure base plate 140 functions also as a member for reinforcing rigidity of the load beam base plate 130. Accordingly, without any increase in thickness of the load beam base plate 130, it is possible to improve rigidity in the seek direction of the portion of the magnetic head suspension 1 that is positioned on a distal end side from the load bending center line BL.

In the present embodiment, as shown in FIGS. 1A, 1B, and 2, the flexure base plate 140 has a pair of wider regions 148 that extend respectively from the load-beam-part contacting region 141 outwards in the suspension widthwise direction beyond the load beam base plate 130 at an area extending from the portion welded to the elastic plate 60 together with the load beam base plate 130 to the distal end portion of the load-beam-part contacting region 141 in the suspension lengthwise direction, the pair of wider regions 148 being arranged symmetrically to each other about the longitudinal center line CL.

Provision of the pair of wider regions 148 further improves the effect that the flexure base plate 140 reinforces rigidity in the seek direction of the load beam part 30.

The pair of wider regions 148 may be formed by utilizing bridge parts that connect adjacent flexure base plates with one another in a case where the plurality of flexure base plates are made of one sheet material.

More specifically, in order to prevent deformation of the plurality of flexure base plates in the case where the flexure base plates are ordinarily made of one sheet material, firstly formed is a pre-formed body that includes the plurality of flexure base plates each connected to the adjacent flexure base plates by the bridge parts, which are then cut to obtain the individual flexure base plates.

Upon production of the flexure base plates according to the above method, the pre-formed body may be preferably formed so that the bridge parts are cut to configure the wider regions 148.

The above production method realizes the flexure base plates 140 each provided with the wider regions 148 with no substantial increase in the number of processes.

As already described, the load beam base plate 130 in the present embodiment is provided with the flange portions 35 on the both side edges thereof. As shown in FIG. 1A, the flange portions 35 are respectively bent to be spaced apart from the disk surface. Further, as shown in FIGS. 1B and 2, the flexure base plate 140 is brought into contact with the lower surface of the load beam base plate 130 that is positioned on a side close to the disk surface.

Therefore, the flexure base plate 140 could be provided with the wider regions 148 without interference with the flange portions 35.

Further, the magnetic head suspension 1 according to the present embodiment is configured as described below so that the flexure base plate 140 and the load beam base plate 130 are firmly joined with each other as well as so that the elastic plate 60 is allowed to be easily deformed by being elastically twisted around the load bending center line BL.

More specifically, as shown in FIG. 2, the load-beam-part contacting region 141 of the flexure base plate 140 has a proximal end side including a central proximal-end-side extension portion 141a and a pair of transition portions 141b. The central proximal-end-side extension portion 141a extends toward the proximal end side beyond the load bending center line BL at the center in the suspension widthwise direction. The pair of transition portions 141b extend from both sides in the suspension widthwise direction toward the proximal end side so as to be connected respectively to the pair of bridge regions 145. The pair of transition portions 141b are symmetric to each other about the longitudinal center line CL.

As shown in FIG. 2, in the above configuration, the central proximal-end-side extension portion 141a is welded to the load beam base plate 130 as well as to the elastic plate 60 at one or a plurality of welding points 25 that are positioned symmetrically about the longitudinal center line CL (according to the drawing, one welding point 25 positioned on the longitudinal center line CL). Thus, the flexure base plate 140 and the load beam base plate 130 are firmly joined to each other.

As also shown in FIG. 2, the proximal end side of the load-beam-part contacting region 141 of the flexure base plate 140 includes portions 141c that are positioned respectively between the central proximal-end-side extension portion 141a and the pair of transition portions 141b. The portions 141c each have a concave shape that is opened toward the proximal end side in planar view and that has distal ends positioned on the load bending center line BL or extended beyond the load bending center line BL toward the distal end side of the magnetic head suspension.

The above configuration prevents as much as possible rigidity of the flexure base plate 140 from adversely affecting elastic deformation of the elastic plate 60 to twist around the load bending center line BL.

Figure 4:
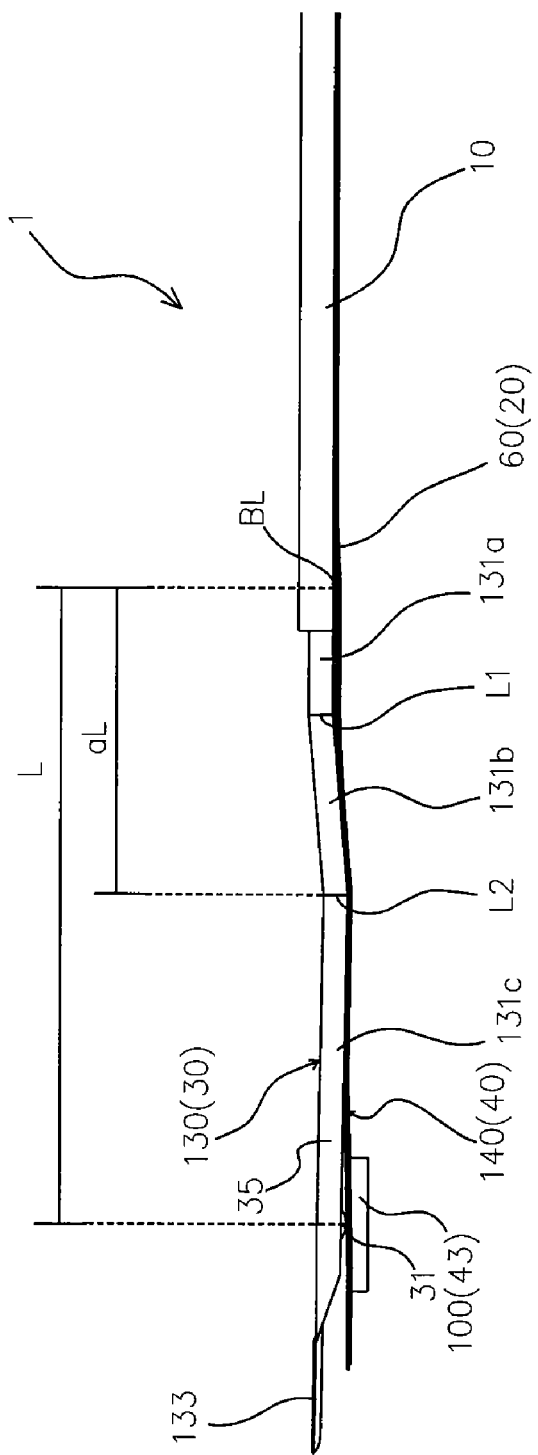
FIG. 4 is a side view of the magnetic head suspension shown in FIG. 1.

FIG. 4 is a side view of the magnetic head suspension 1.

In the present embodiment, as shown in FIGS. 1A, 1B, 2, and 4, the portion of the load beam base plate 130 that is positioned on a distal end side from the load bending center line BL includes a parallel region 131a, an intermediate region 131b, and a distal region 131c. The parallel region 131a extends substantially in parallel with the load-beam-part contacting region 65 of the elastic plate 60. The intermediate region 131b extends from the parallel region 131a toward the distal end side. The distal region 131c extends form the intermediate region 131b toward the distal end side.

The parallel region 131a is welded directly or indirectly to the load-beam-part contacting region 65 at the appropriate welding points 21 so as to be substantially in parallel with the load-beam-part contacting region 65.

The intermediate region 131b extends from the parallel region 131a toward the distal end side beyond a proximal-side bending line L1 along the suspension widthwise direction.

The distal region 131c extends from the intermediate region 131b toward the distal end side beyond a distal-side bending line L2 along the suspension widthwise direction, and is provided with the dimple 31 that is brought into contact with the head-mounting region 43.

In other words, in the present embodiment, the load beam base plate 130 is bent at two locations of the proximal-side bending line L1 and the distal-side bending line L2 that are positioned on a distal end side from the load bending center line BL.

As shown in FIGS. 1A and 1B, the load beam base plate 130 further includes a lift tab region 133 that extends toward the distal end side from the distal region 131c.

The lift tab region 133 is used for switching between the loaded condition and the unloaded condition of the magnetic head suspension 1. More specifically, the lift tab region 133 is engaged with a lump of the data storage device when the magnetic head suspension 1 is moved in the seek direction so that the magnetic head slider 100 is positioned radially outward of the disk surface during the magnetic head suspension 1 is shifted to the non-operation (unloaded) condition. This configuration improves impact resistance of the magnetic head suspension 1 in the unloaded condition.

As shown in FIGS. 1A, 1B, and 2, the magnetic head suspension 1 according to the present embodiment further includes an equilibrating weight part 200 that is fixed to the load beam base plate 130 so that it is positioned on a proximal end side from the load bending center line BL and at least a part is positioned in the concave part 13 in planar view.

More specifically, the load beam base plate 130 is further provided with a proximal region 132 positioned on a proximal end side from the load bending center line BL. The equilibrating weight part 200 is welded to the proximal region 132 of the load beam base plate 130 so as to be positioned on a proximal end side from the load bending center line BL and to be positioned in the concave part 13 in planar view.

The configuration makes it possible to allow a center of gravity in a movable region of the magnetic head suspension 1 (excluding the supporting part 10) to be positioned as close as possible to the load bending center line BL. In other words, according to the configuration, a member supported by the elastic plate 60 functioning as the load bending center line BL has a distal end side and a proximal end side with the load bending center line BL as a reference, the distal end and proximal end sides being equilibrated with each other in the weights. Therefore, vibration about the load bending center line BL is inhibited as much as possible even upon application of an external impact.

More specifically, the equilibrating weight part 200 has a load-beam-part contacting region 210 and a proximal-end-side region 220. The load-beam-part contacting region 210 is welded at appropriate welding points 55 and 56 to the proximal region 132 of the load beam base plate 130 in a state of being brought into contact with the upper surface thereof. The proximal-end-side region 220 extends from the load-beam-part contacting region 210 toward the proximal end side within the concave part 13.

As shown in FIG. 2, in the present embodiment, the load-beam-part contacting region 210 of the equilibrating weight part 200 is welded to both the load beam base plate 130 and the elastic plate 60 at the pair of distal-end-side welding points 55 that are positioned symmetrically to each other about the longitudinal center line CL, and is also welded to the load beam base plate 130 at the pair of proximal-end-side welding points 56 that are positioned symmetrically to each other about the longitudinal center line CL on a proximal end side from the pair of distal-end-side welding points 55.

The equilibrating weight part 200 can be made, for example, of a metal plate having a thickness of approximately 0.05 mm to 0.4 mm.

As already described, the load beam base plate 130 is provided on the both sides in the width direction with the pair of flange portions 35 that are bent upwards. The load-beam-part contacting region 210 of the equilibrating weight part 200 is welded to the upper surface of the load beam base plate 130 in a state of being brought into contact therewith between the pair of flange portions 35. Therefore, predetermined rigidity is secured at the connection between the equilibrating weight part 200 and the load beam base plate 130.

Figure 5:
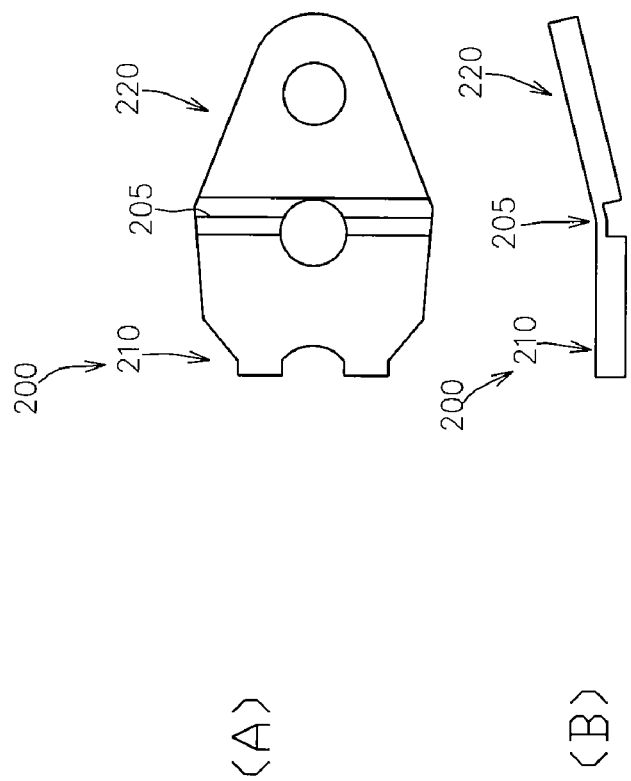
FIGS. 5A and 5B are a bottom view (a view seen from a side close to the disk surface) and a side view of an equilibrating weight part in the magnetic head suspension according to the first embodiment, respectively.

FIGS. 5A and 5B are respectively a bottom view (a view seen from the side close to the disk surface) and a side view of the equilibrating weight part 200.

As shown in FIGS. 1A, 1B, 2, 5A, and 5B, the equilibrating weight part 200 is provided with a bend portion 205 along the suspension widthwise direction, and is bent at the bend portion 205 such that a region that is positioned on a proximal side from the bend portion 205 gradually moves away from the disk surface as it goes toward the proximal end.

That is, the equilibrating weight part 200 is bent at the bend portion 205 along the suspension widthwise direction, and the region that is positioned on a proximal end side from the bend portion 205 gradually moves away from the disk surface as a distance to the proximal end is reduced.

The configuration makes it possible to effectively prevent the equilibrating weight part 200 from coming into contact with the disk surface even in a case where the magnetic head suspension 1 is fluctuated about the load bending center line BL due to an external impact.

As shown in FIG. 5B, in the present embodiment, the equilibrating weight part 200 is made thinner at the region inclusive of the bend portion 205 relative to the remaining region.

According to the configuration, it is possible to reliably perform a bending process of the equilibrating weight part 200 at the bend portion 205.

The region inclusive of the bend portion 205 can be easily thinned by etching at least one of surfaces (the surface facing the disk surface in the present embodiment) of a portion of the equilibrating weight part 200 at which the bend portion 205 is positioned.

In the present embodiment, as shown in FIGS. 1A, 1B, 2, and 4, the elastic plate 60 is fixed to the surfaces of the supporting pieces 12 that face the disk surface, and the load beam base plate 130 is fixed to the surface of the elastic plate 60 that is positioned on an opposite from the disk surface.

The load beam base plate 130 is bent at the proximal-side bending line L1 such that the intermediate region 131*b* is gradually brought closer to the disk surface as it goes toward the distal end with the parallel region 131*a* as a reference. The load beam base plate 130 is also bent at the distal-side bending line L2 such that the distal region 131*c* gradually moves away from the disk surface as it goes toward the distal end with the intermediate region 131*b* as a reference.

In other words, in the present embodiment, the proximal-side bending line L1 is made into a convex shape protruding in a direction away from the disk surface, and the distal-side bending line L2 is made into a convex shape protruding in a direction towards the disk surface.

As described above, the portion of the load beam base plate 130 that is positioned on a distal end side from the load bending center line BL is bent at the two locations of the proximal-side bending line L1 and the distal-side bending line L2. The load beam base plate 130 thus configured makes it possible to improve rigidity so as to increase resonant frequency in the SWAY mode of the magnetic head suspension 1. The above load beam base plate 130 also enables adjustment of positions of torsion center lines in a plurality of torsion modes, which results in improvement in vibration properties in the seek direction for the magnetic head suspension 1.

In the present embodiment, the parallel region 131*a* and the distal region 131*c* are disposed to be substantially parallel to the disk surface, while the intermediate region 131*b* is disposed to be gradually brought closer to the disk surface as the distance to the distal end is reduced.

The resonant frequency in the SWAY mode can be increased particularly by arranging the parallel region 131*a* substantially in parallel with the disk surface.

In the present embodiment, the distal-side bending line L2 is positioned in the vicinity of the intermediate point between the load bending center line BL and the dimple 31 in the suspension lengthwise direction. In other words, as shown in FIG. 4, assuming that the dimple 31 is away from the load bending center line BL by a distance L, the position of the distal-side bending line L2 in the suspension lengthwise direction is set such that the distal-side bending line L2 is away from the load bending center line BL by a distance L/2.

According to this configuration, it is possible to effectively displace, with no increase in bending angle at the distal-side bending line L2, the center of gravity of the load beam part 30 in the z direction that is perpendicular to the disk surface. Therefore, the center of torsion motion of the load beam part 30 in the vibration mode can be adjusted so as to be positioned at a desired location while reducing the bending angle at the distal-side bending line L2.

Furthermore, the above configuration prevents the head-mounting region 43 from being remarkably inclined with respect to the disk surface due to bending at the distal-side bending line L2, so that the head-mounting region 43 is effectively prevented from being spaced apart from the dimple 31.

As shown in FIGS. 1A and 1B, the proximal-side bending line L1 and the distal-side bending line L2 are preferably positioned in the suspension lengthwise direction so as not to be overlapped with the pair of wider regions 148.

Such a configuration allows the load beam part 30 to be reliably bent while securing rigidity of the load beam part 30 thanks to provision of the pair of wider regions 148.

As shown in FIGS. 1A and 1B, in the present embodiment, the proximal-side bending line L1 is positioned between the load-beam-part contacting region 65 of the elastic plate 60 and the pair of wider regions 148 of the flexure base plate 140 in the suspension lengthwise direction. Further, the distal-side bending line L2 is positioned on a distal end side from the pair of wider regions 148 in the suspension lengthwise direction.

In the present embodiment, the proximal-side bending line L1 is positioned between the pair of wider regions 148 and the load-beam-part contacting region 141 in the suspension lengthwise direction. Alternatively, the proximal-side bending line L1 may be positioned on a distal end side from the pair of wider regions 148 in the suspension lengthwise direction.

Further, as already described, in the present embodiment, the proximal-side bending line L1 has the convex shape that protrudes in a direction away from the disk surface, while the distal-side bending line L2 has the convex shape that protrudes in a direction towards the disk surface. In this configuration, the distal region 131c can be kept substantially in parallel with the disk surface and be brought closer to the disk surface relative to the parallel region 131a, while the proximal end of the load beam part 30 being spaced apart from the disk surface.

Described below are results of analyses on the proximal-side bending line L1 and the distal-side bending line L2.

These analyses assume that the dimple 31 is away from the load bending center line BL by the distance L in the suspension lengthwise direction, as well as that the distal-side bending line L2 is away from the load bending center line BL by a distance aL ("a" as a coefficient) in the suspension lengthwise direction n.

Further, the top of the dimple 31 is assumed to be away from the load bending center line BL of the elastic plate 60 by a distance 0.024 L in the height direction (the thickness direction).

Described first is the analysis on the position of the distal-side bending line L2 in the suspension lengthwise direction.

Figure 6:
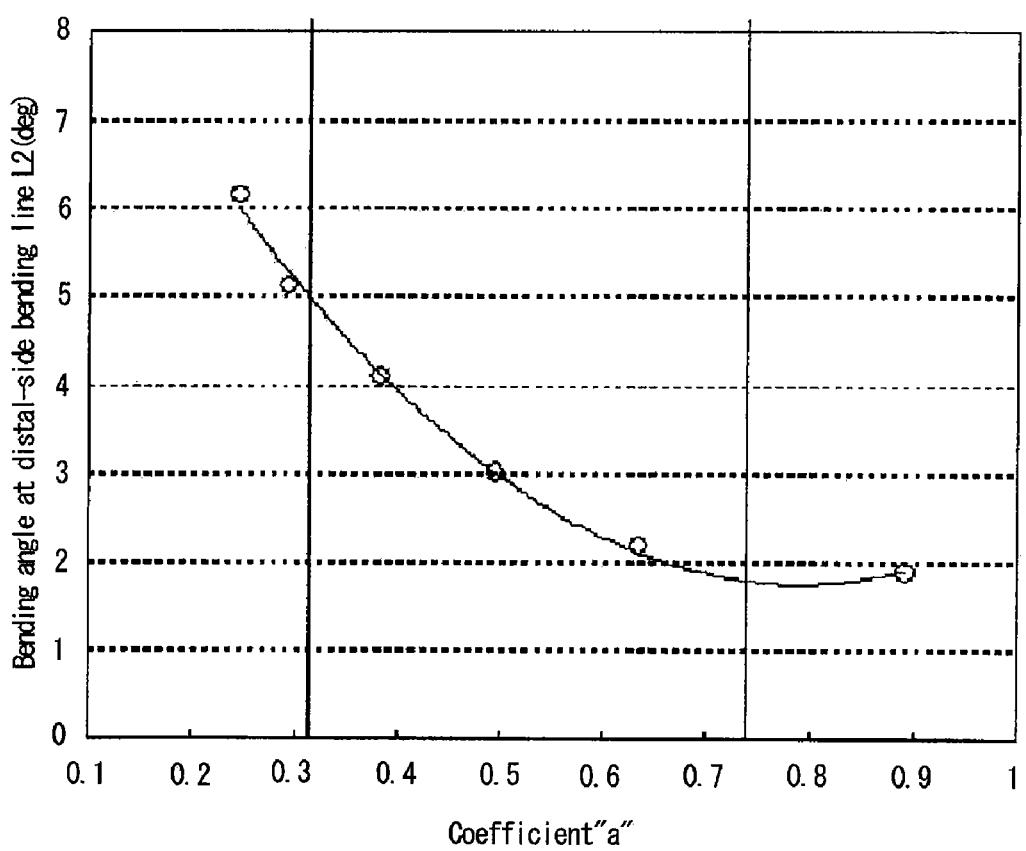
FIG. 6 is a graph showing a relationship between a position of the distal-side bending line with respect to the suspension lengthwise direction and a bending angle at the distal-side bending angle in the magnetic head suspension according to the first embodiment, and indicates the bending angle of the load beam base plate at the distal-side bending line that is required in order to keep a height in a thickness direction of a portion of the load beam base plate at which the distal-side bending line is positioned at a fixed height while varying a position of the distal-side bending line along the suspension lengthwise direction.

FIG. 6 is a graph indicating a required relationship between a bending angle at the distal-side bending line L2 and a position of the distal-side bending line L2 in the suspension lengthwise direction, in order to keep the distal-side bending line L2 of the load beam base plate 130 at a predetermined constant fixed height in the thickness direction (the height in the direction perpendicular to the disk surface).

In the magnetic head suspension 1 according to the present embodiment, when the distance aL between the distal-side bending line L2 and the load bending center line BL exceeds 0.74 L, the distal-side bending line L2 will be positioned on a distal end side from the welding points 51 where the flexure base plate 140 and the load beam base plate 130 are welded to each other. In this case, the dimple 31 will be possibly spaced apart from the head-mounting region 43, resulting in difficulty in control of inclination of the head-mounting region 43.

Furthermore, when the bending angle at the distal-side bending line L2 exceeds 5°, the flange portions 35 are remarkably distorted and cannot be stably formed.

Accordingly, when the coefficient "a" has a value within a range of $0.31 \leq a \leq 0.74$, the conditions are satisfied that the distance aL between the distal-side bending line L2 and the load bending center line BL is not more than 0.74 L as well as that the bending angle at the distal-side bending line L2 is not more than 5°. The area "in the vicinity of the intermediate point" thus satisfies the above range.

When the coefficient "a" is preferably made equal to 0.5, it is possible to significantly displace in the vertical direction the torsion center line of the load beam base plate 130 with a small bending angle at the distal-side bending line L2.

Described next is the result of analysis, in accordance with the finite element method, on the relation among the bending angles at the proximal-side bending line L1 as well as the bending angles at the distal-side bending line L2, the resonant frequency in the SWAY direction, and the gain in the torsion mode.

In this analysis, the distance L between the load bending center line BL and the dimple 31 in the suspension lengthwise direction is set to 6.038 mm, and the load beam base plate 130 is formed to have a thickness of 0.02 mm. Further, the distance aL between the distal-side bending line L2 and the load bending center line BL in the suspension lengthwise direction is set to 2.993 mm, and the difference in height (in the thickness direction) between the top of the dimple 31 and the portion of the elastic plate through which the load bending center line BL passes is set to 0.145 mm.

Figure 7:
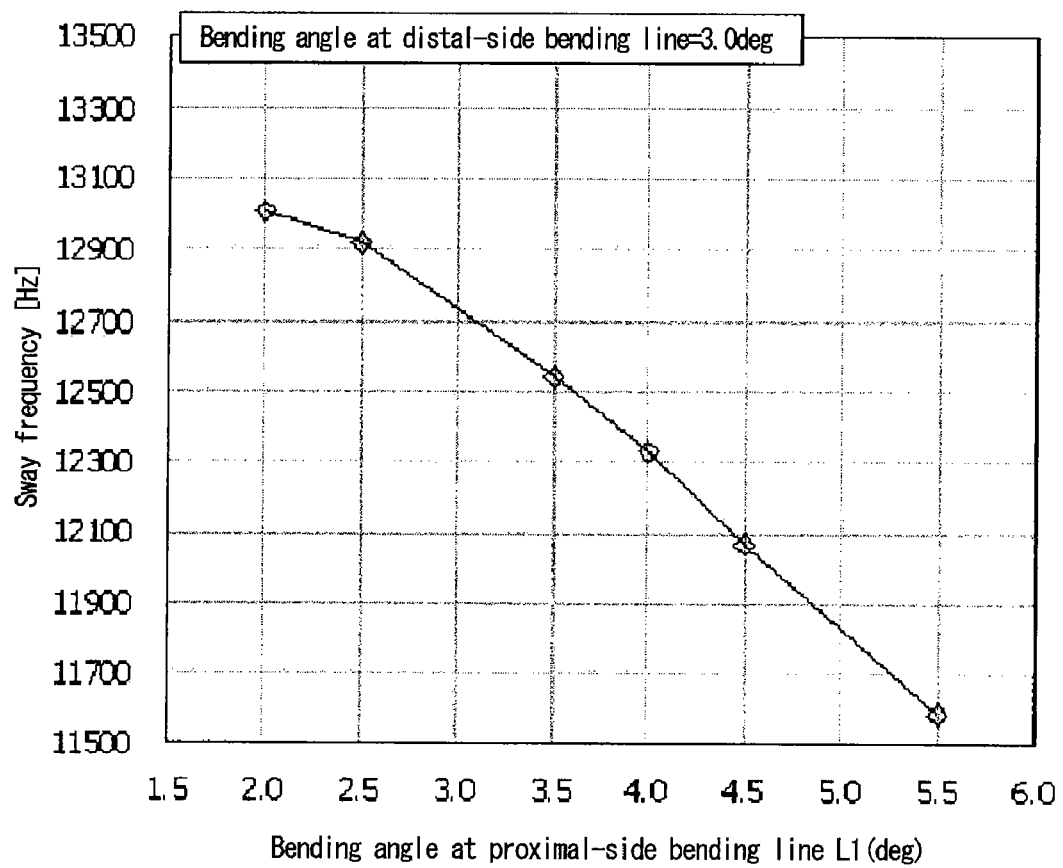
FIG. 7 is a graph indicating variation in resonant frequency of the magnetic head suspension in the SWAY mode, upon variation in bending angle of the load beam base plate at a proximal-side bending line with the bending angle of the load beam base plate at the distal-side bending line being fixed to a predetermined value.

FIG. 7 is a graph indicating variation in resonant frequency of the magnetic head suspension 1 in the SWAY mode, upon variation in bending angle at the proximal-side bending line L1 with the bending angle at the distal-side bending line L2 being fixedly set to 3.0°.

Figure 8:
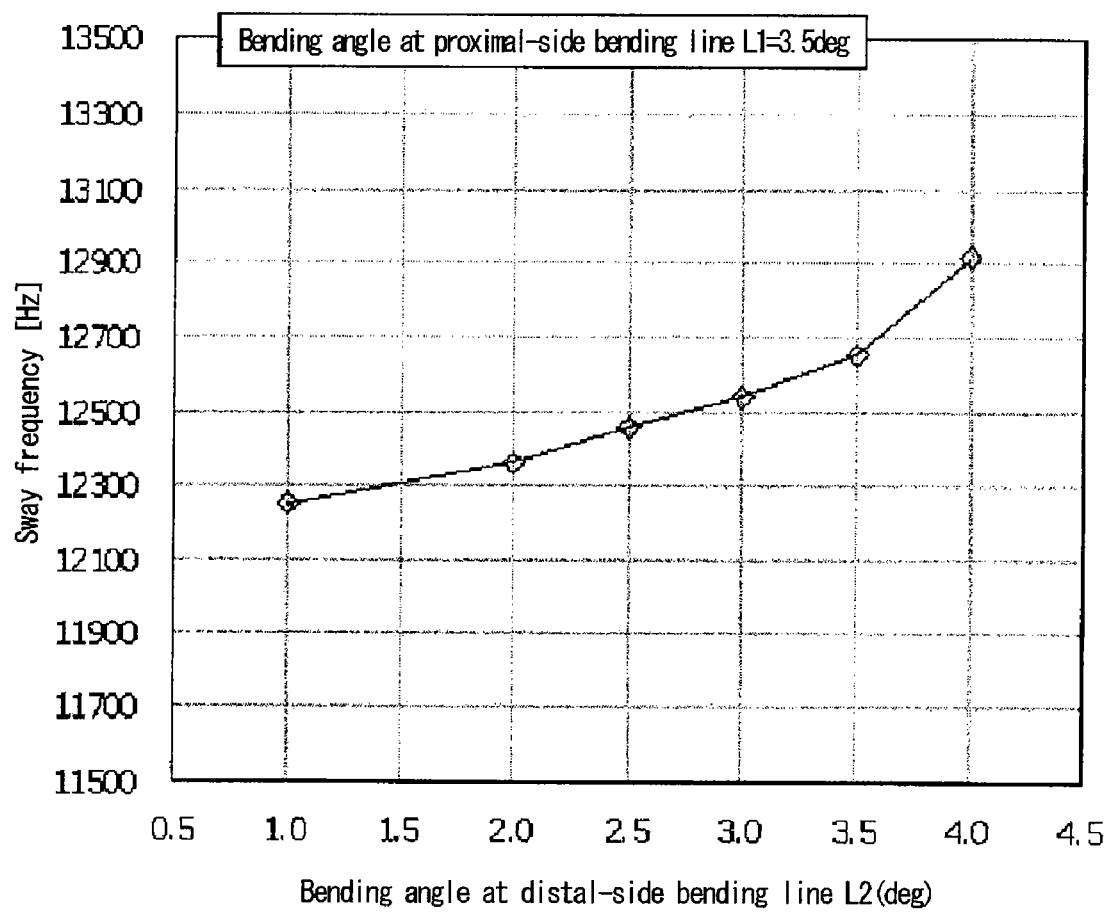
FIG. 8 is a graph indicating variation in resonant frequency of the magnetic head suspension 1 in the SWAY mode, upon variation in the bending angle of the load beam base plate at the distal-side bending line with the bending angle of the load beam base plate at the proximal-side bending line being fixed to a predetermined value.

FIG. 8 is a graph indicating variation in resonant frequency of the magnetic head suspension 1 in the SWAY mode, upon variation in the bending angle at the distal-side bending line L2 with the bending angle at the proximal-side bending line L1 being fixedly set to 3.5°.

Figure 9:
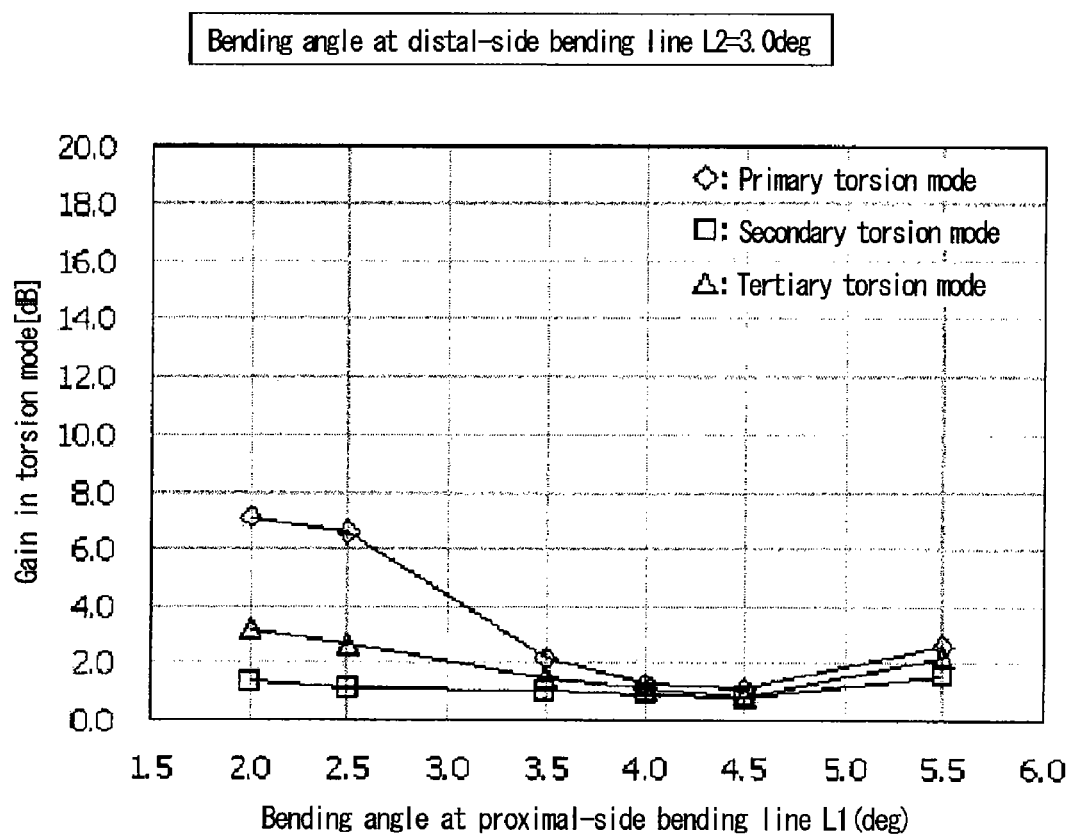
FIG. 9 is a graph indicating variations in gain of the magnetic head suspension in the respective torsion modes, upon variation in the bending angle of the load beam base plate at the proximal-side bending line with the bending angle of the load beam base plate at the distal-side bending line being fixed to a predetermined value.

FIG. 9 is a graph indicating variations in gain of the magnetic head suspension 1 in the respective torsion modes, upon variation in the bending angle at the proximal-side bending line L1 with the bending angle at the distal-side bending line L2 being fixedly set to 3.0°.

Figure 10:
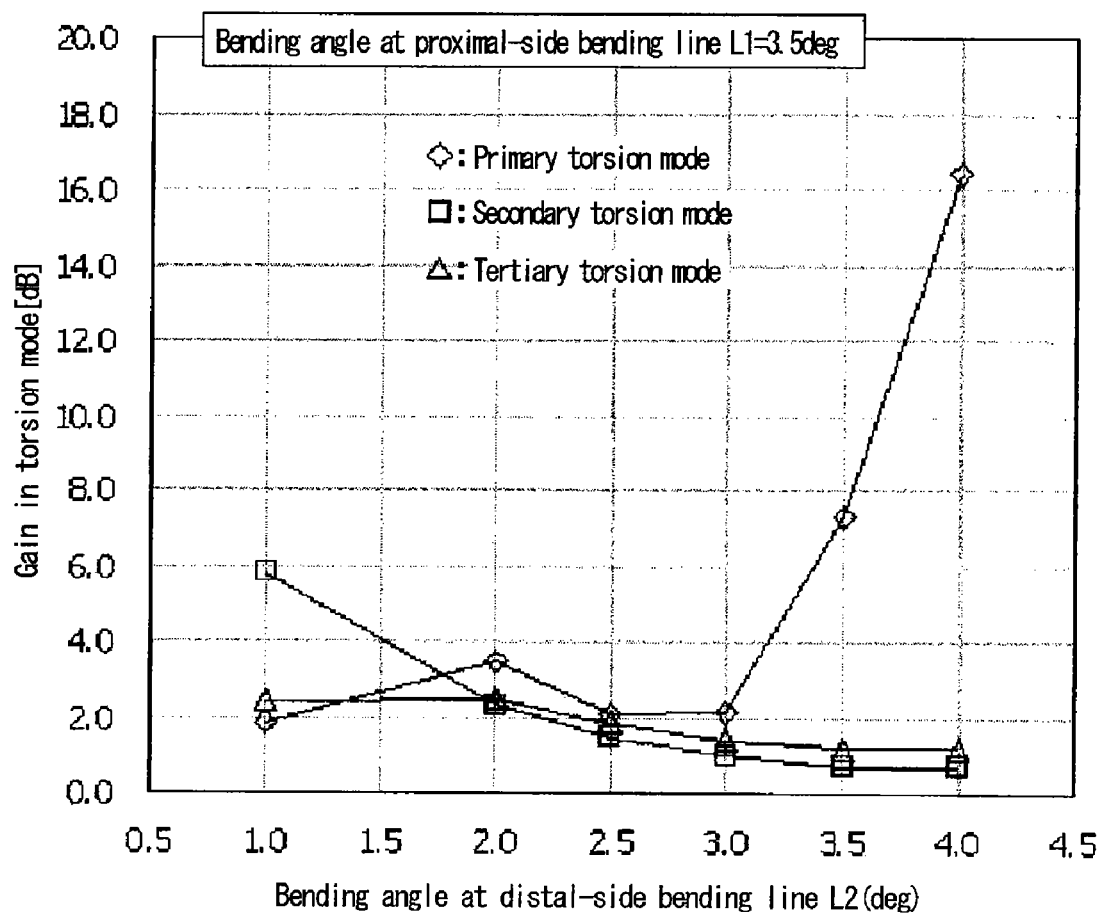
FIG. 10 is a graph indicating variations in gain of the magnetic head suspension in the respective torsion modes, upon variation in the bending angle of the load beam base plate at the distal-side bending line with the bending angle of the load beam base plate at the proximal-side bending line being fixed to a predetermined value.

FIG. 10 is a graph indicating variations in gain of the magnetic head suspension 1 in the respective torsion modes, upon variation in the bending angle at the distal-side bending line L2 with the bending angle at the proximal-side bending line L1 being fixedly set to 3.5°.

It is noted that the variations in gain indicated in FIGS. 9 and 10 each disregard the influences due to the SWAY mode.

The primary torsion mode indicated in each of FIGS. 9 and 10 specifies a mode in which the entire load beam part 30 is twisted around the longitudinal center line CL of the magnetic head suspension with a fulcrum thereof located in the vicinity of the elastic plate 60.

The secondary torsion mode specifies a mode, among the torsion modes around the longitudinal center line CL of the magnetic head suspension, in which there is provided a node (which is a boundary with respect to the direction of torsion motion) in the vicinity of the center of the load beam part 30 in the longitudinal direction thereof and in which the direction of torsion of the supporting part 10 around the longitudinal center line CL of the magnetic head suspension is in the phase opposite to that of the direction of torsion of the proximal end side of the load beam part 30.

The tertiary torsion mode specifies a mode, among the torsion modes around the longitudinal center line CL of the magnetic head suspension, in which there is provided a node (which is a boundary with respect to the direction of torsion motion) in the vicinity of the center of the load beam part 30 in the longitudinal direction thereof and in which the direction of torsion for the supporting part 10 around the longitudinal center line CL of the magnetic head suspension is in the phase same as that of the direction of torsion of the proximal end side of the load beam part 30.

As shown in FIGS. 7 and 8, the resonant frequency in the SWAY mode is varied in accordance with variation(s) in the bending angle at the proximal-side bending line L1 and/or the distal-side bending line L2. What is found from the above is that the resonant frequency in the SWAY mode can be controlled by adjustment of the bending angle(s) at the proximal-side bending line L1 and/or the distal-side bending line L2.

More specifically, adjustment of the bending angle(s) avoids harmonization between the resonant frequency in the SWAY mode and the resonant frequency in another mode of the magnetic head suspension 1, and/or harmonization between the resonant frequency of the magnetic head suspension 1 in the SWAY mode and the resonant frequency of any other components of the data storage device other than the magnetic head suspension 1.

As can be seen from FIGS. 9 and 10, in order to suppress the gain in the primary twist mode to be small, it is suitable to set the bending angle at the proximal-side bending line L1 to be in the range of 3.5° to 4.5° and to set the bending angle at the distal-side bending line L2 to be in the range of 1.0° to 3.0°.

Similarly, according to these drawings, in order to suppress the gain in the secondary torsion mode to be small, it is suitable to increase the bending angle at the distal-side bending line L2. It is noted that this secondary torsion mode does not depend on the bending angle at the proximal-side bending line L1.

With regard to the tertiary torsion mode, in comparison to the primary and secondary torsion modes, there is less in variation of the gain in accordance with the variation of the bending angels at the proximal-side bending line L1 and the distal-side bending line L2.

Therefore, in order to simultaneously suppress the gains in the primary and secondary torsion modes to be small, it is preferable to set the bending angle at the proximal-side bending line L1 to be in the range of 3.5° to 4.5° and to set the bending angle at the distal-side bending line L2 to be in the range of 2.5° to 3.0°.

Second Embodiment

A second embodiment of the magnetic head suspension according to the present invention will now be explained.

Figure 11:
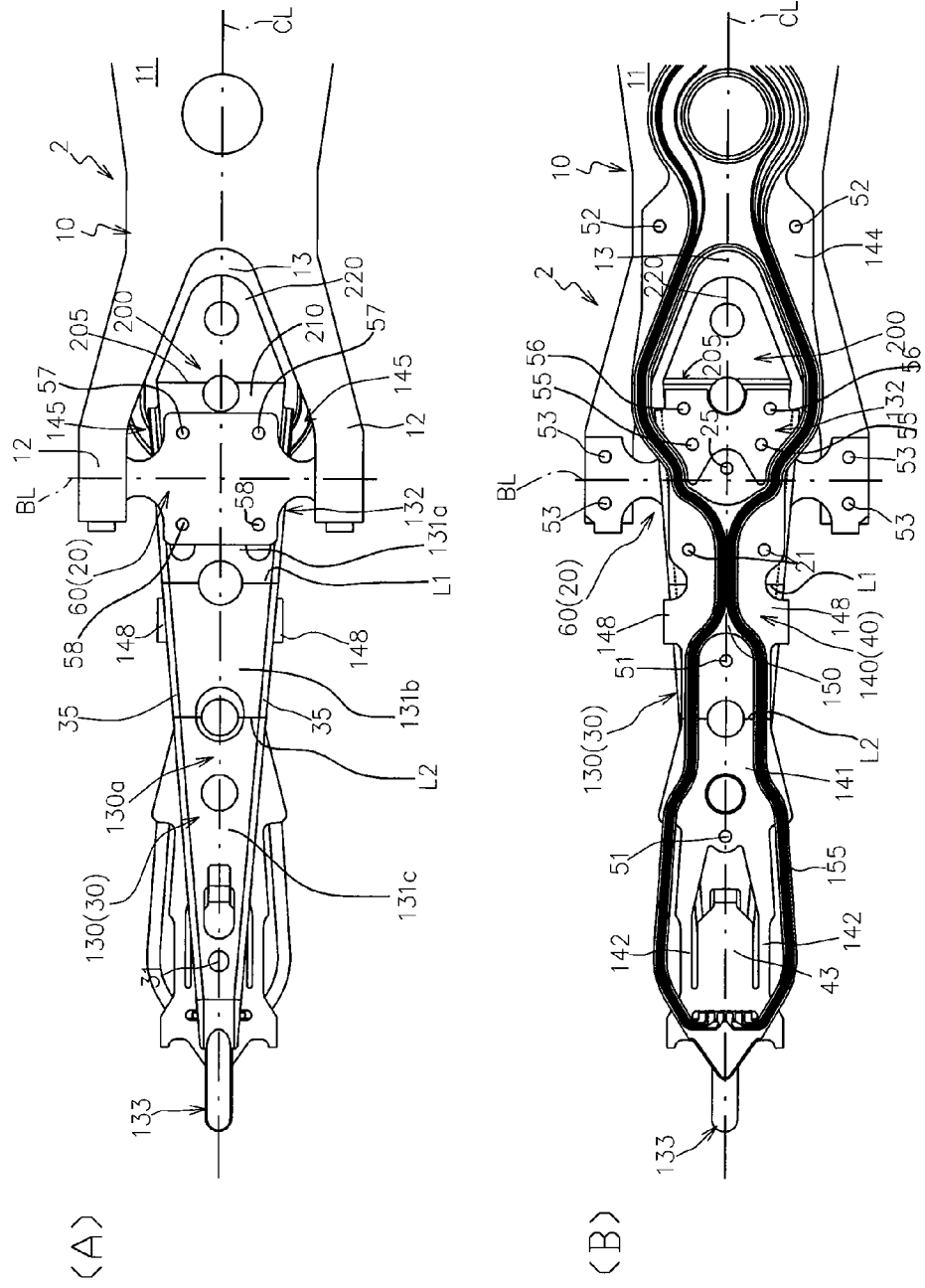
FIGS. 11A and 11B are a top view and a bottom view of a magnetic head suspension according to a second embodiment of the present invention, respectively.
Figure 12:
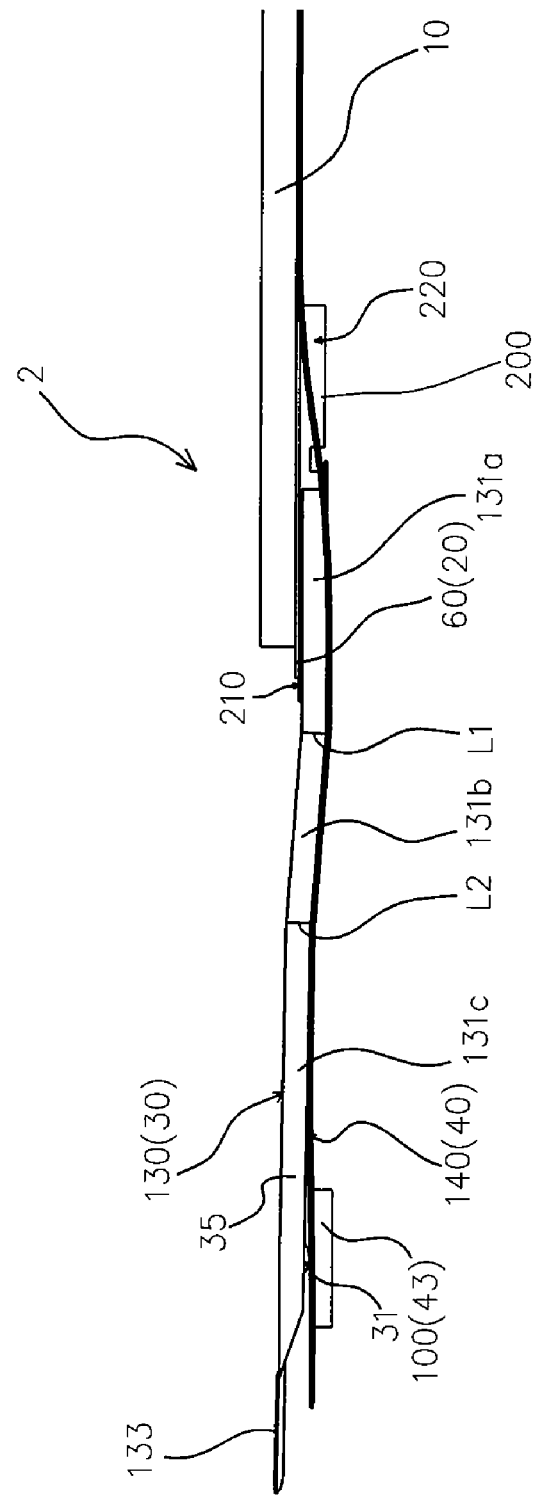
FIG. 12 is a side view of the magnetic head suspension shown in FIGS. 11A and 11B.

FIGS. 11A and 11B are a top view and a bottom view of a magnetic head suspension 2 according to the second embodiment of the present invention, respectively, and FIG. 12 is a side view of the magnetic head suspension 2 shown in FIGS. 11A and 11B. In the figures, the components same as those in the first embodiment are denoted by the same reference numerals to omit the detailed description thereof.

In the magnetic head suspension 2 according to the present embodiment, as shown in FIGS. 11A, 11B and 12, the elastic plate 60 is fixed to the surfaces of the supporting pieces 12 that are positioned on a side close to the disk surface, the equilibrating weight part 200 is fixed to the surface of the elastic plate 60 that is positioned on a side close to the disk surface, and load beam base plate 130 is fixed to the surface of the equilibrating weight part 200 that is positioned on a side close to the disk surface. The load beam base plate 130 is bent at the proximal-side bending line L1 such that the intermediate region 131b gradually moves away from the disk surface as it goes toward the distal end with the parallel region 131a as a reference. The load beam base plate 130 is also bent at the distal-side bending line L2 such that the distal region 131c is gradually brought closer to the disk surface as it goes toward the distal end with the intermediate region 131b as a reference.

More specifically, the surfaces of the supporting pieces 12 that are closer to the disk surface and the surface of the elastic plate 60 that is opposite from the disk surface are fixed to each other, the surface of the elastic plate 60 that is closer to the disk surface and the surface of the equilibrating weight part 200 that is opposite from the disk surface are fixed to each other, and the surface of the equilibrating weight part 200 that is closer to the disk surface and the surface of the load beam base plate 130 that is opposite from the disk surface are fixed to each other.

In the present embodiment, the equilibrating weight part 200 is welded to the elastic plate 60 at welding points 57, 58 in a state where at least a part thereof is positioned within the concave region 13.

The intermediate region 131b of the load beam base plate 130 is bent at the proximal-side bending line L1 so as to be away from the disk surface as a distance to a distal end is reduced with the parallel region 131a as a reference, and the distal region 131c of the load beam base plate 130 is bent at the distal-side bending line L2 so as to be come close to the disk surface as a distance to a distal end is reduced with the intermediate region 131b as a reference.

That is, in the present embodiment, the proximal-side bending line L1 is made into a convex shape protruding in a direction towards the disk surface, and the distal-side bending line L2 is made into a convex shape protruding in a direction away from the disk surface.

In the present embodiment, the parallel region 131a and the distal region 131c are disposed to be substantially parallel to the disk surface, while the intermediate region 131b is disposed to be gradually away from the disk surface as the distance to the distal end is reduced.

By forming the proximal-side bending line L1 into the convex shape that protrudes in the direction towards the disk surface and forming the distal-side bending line L2 into the convex shape that protrudes in the direction away from the disk surface, it is possible to disposing the distal region 131c farther away from disk surface than the parallel region 131a with keeping the distal region 131c substantially in parallel with the disk surface, while having the proximal end of the load beam 30 come close to the disk surface.

It is possible to utilize another combinations of a relative position of the supporting part 10, the elastic plate 60, the load beam base plate 130 and the equilibrating weight part 200 with respect to the vertical direction (that is, the relative position thereof with respect to the z direction perpendicular to the disk surface) with the bending direction at the of the proximal-side bending line L1 and the distal-side bending line L2, which are different from those in the first and second embodiments.

Specifically, in the magnetic head suspension in which the elastic plate 60 is fixed to the surface of the supporting pieces 12 that are positioned on a side away from the disk surface, the load beam base plate 130 is fixed to the surface of the elastic plate 60 that is positioned on a side away from the disk surface, and the equilibrating weight part 200 is fixed to the surface of the load beam base plate 130 that is positioned on a side away from the disk surface, it is possible to bend the load beam base plate 130 at the at the proximal-side bending line L1 so that the intermediate region 131b is gradually come close to the disk surface as the distance to the distal end is reduced with the parallel region 131a as a reference, and to also bend the load beam base plate 130 at the distal-side bending line L2 such that the distal region 131c is gradually away from the disk surface as the distance to the distal end is reduced with the intermediate region 131b as a reference.

Alternatively, in the magnetic head suspension in which the elastic plate 60 is fixed to the either one or the other surface of the supporting pieces 12 that are positioned on a side close to and away from the disk surface, the load beam base plate 130 is fixed to the surface of the elastic plate 60 that is positioned on a side away from the disk surface, and the equilibrating weight part 200 is fixed to the surface of the load beam base plate 130 that is positioned on a side away from the disk surface, it is possible to bend the supporting pieces 12 at a supporting-part bending line that is along the suspension widthwise direction and that is positioned between the proximal end and the distal end so that the supporting pieces 12 come closer to the disk surface as a distance to the distal end is reduced (that is, so that the parallel region 131a comes closer to the disk surface as a distance to the distal end is reduced), and to also bend the load beam base plate 130 at the at the proximal-side bending line L1 so that the intermediate region 131b is gradually away from the disk surface as the distance to the distal end is reduced with the parallel region 131a as a reference and to bend the load beam base plate 130 at the distal-side bending line L2 such that the distal region 131c is gradually come closer to the disk surface as the distance to the distal end is reduced with the intermediate region 131b as a reference.

Third Embodiment

A third embodiment of the magnetic head suspension according to the present invention will now be explained.

Figure 13:
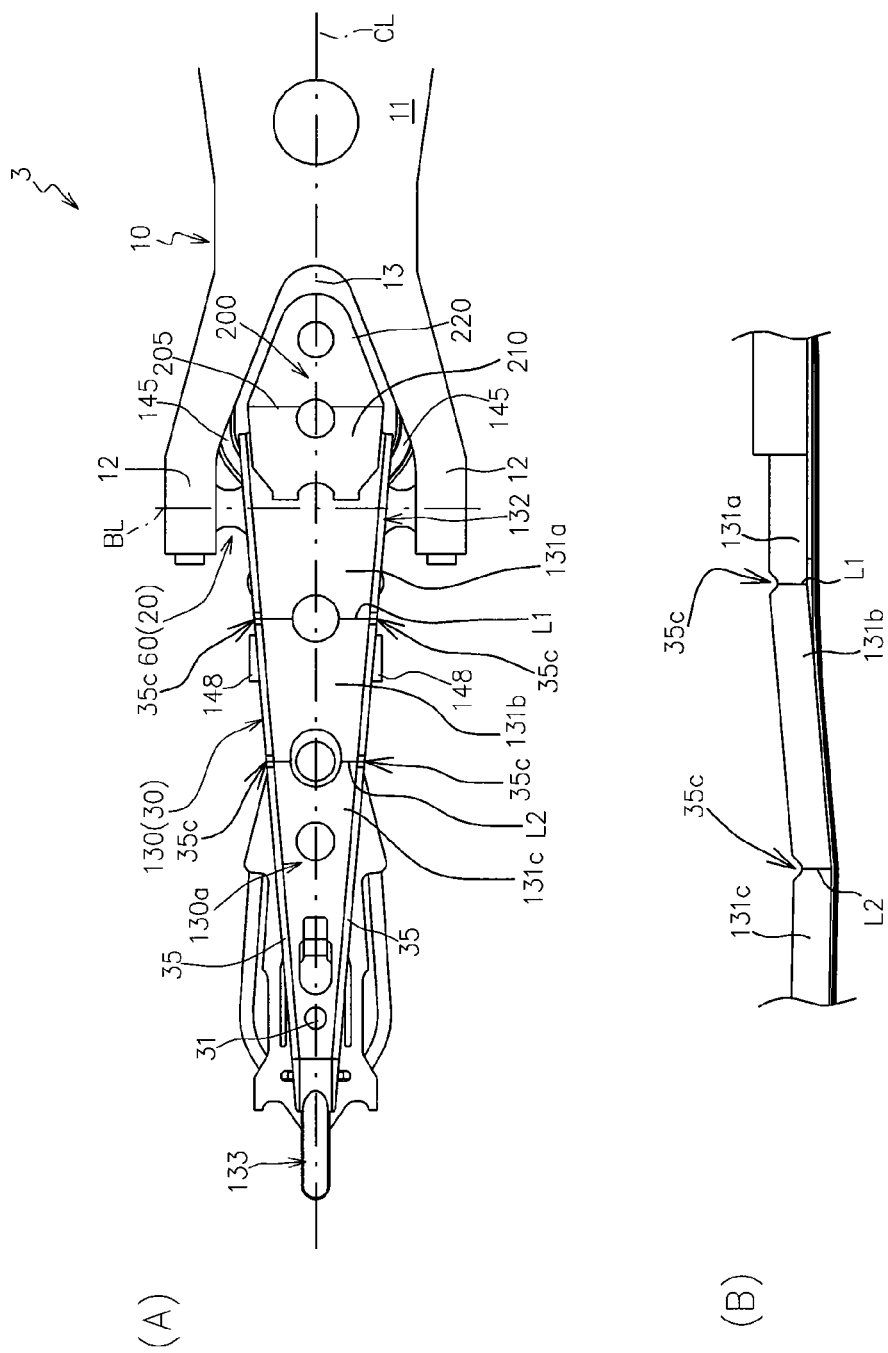
FIGS. 13A and 13B are a top view and a partial side view of a magnetic head suspension according to a third embodiment of the present invention, respectively.

FIGS. 13A and 13B are a top view and a partial side view of a magnetic head suspension 3 according to the third embodiment of the present invention, respectively. In the figures, the components same as those in the first and second embodiments are denoted by the same reference numerals to omit the detailed description thereof.

As shown in FIGS. 13A and 13B, the magnetic head suspension according to the present embodiment is different from the magnetic head suspension 1 according to the first embodiment in that the free ends of the pair of flange portions 35 are provided with notches 35c that are disposed at the same positions as the proximal-side bending line L1 and the distal-side bending line L2 with respect to the suspension lengthwise direction.

More specifically, as shown in FIGS. 13A and 13B, portions of the pair of right and left flange portions 35 with which the proximal-side bending line L1 and the distal-side bending line L2 are intersected are formed with the notches 35c at the free ends.

The configuration makes it possible to easily bend the load beam base plate 130 with the flange portions 35 at the proximal-side bending line L1 and the distal-side bending line L2.

Fourth Embodiment

A fourth embodiment of the magnetic head suspension according to the present invention will now be explained.

Figure 14:
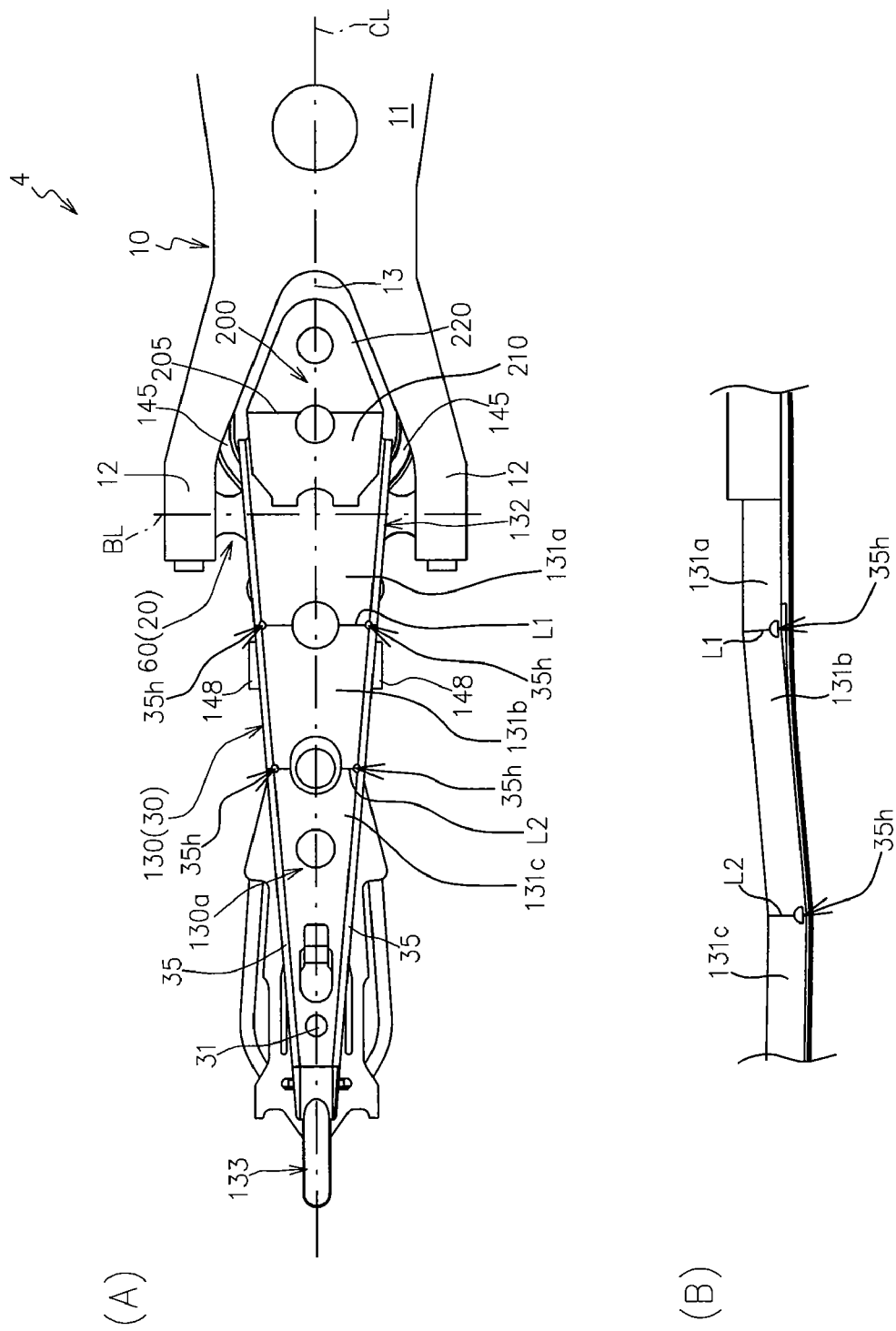
FIGS. 14A and 14B are a top view and a partial side view of a magnetic head suspension according to a fourth embodiment of the present invention, respectively.

FIGS. 14A and 14B are a top view and a partial side view of a magnetic head suspension 4 according to the fourth embodiment of the present invention, respectively. In the figures, the components same as those in the first and second embodiments are denoted by the same reference numerals to omit the detailed description thereof.

As shown in FIGS. 14A and 14B, the magnetic head suspension according to the present embodiment is different from the magnetic head suspension 1 according to the first embodiment in that the load beam base plate 130 is formed with through-holes 35h that are disposed at the same positions as the proximal-side bending line L1 and the distal-side bending line L2 with respect to the suspension lengthwise direction so as to be across boundaries between the main body portion 130a and the pair of flange portions 35 of the load beam base plate 130.

More specifically, the trough-holes 35h are disposed at the positions where the boundaries between the main body portion 130a and the pair of flange portions 35 of the load beam base plate 130 are intersected with the proximal-side bending line L1 and the distal-side bending line L2 so as to be across the boundaries. The load beam base plate 130 with the though-holes 35h could be formed by forming the though-holes 35h in a plate-like member forming the load beam base plate 130, and then bend both sides of the plate-like member to form the flange portions 35.

The configuration makes it possible to easily bend the load beam base plate 130 with the flange portions 35 at the proximal-side bending line L1 and the distal-side bending line L2.

Although the embodiments according to the present invention have been explained above, the present invention is not limited to the embodiments, and various improvements, variations and modifications may be made without departing from the spirit and scope of the present invention. For example, the notches 35c and/or the through-holes 35h could be applied to the load beam base plate 130 in the second embodiment.

What is claimed is:

1. A magnetic head suspension comprising a load bending part that generates a load for pressing a magnetic head slider toward a disk surface, a load beam part that transmits the load to the magnetic head slider, a supporting part that supports the load beam part through the load bending part, and a flexure part that includes a head-mounting region for supporting the magnetic head slider and that is fixed to the load beam part, wherein the supporting part includes a main body region, and a pair of supporting pieces that extend from both ends of the main body region in a suspension widthwise direction toward a distal end side of the suspension so as to define a concave region between the pair of supporting pieces that is opened toward the distal end side of the suspension, the pair of supporting pieces being symmetrical to each other about a longitudinal center line of the magnetic head suspension, wherein the load bending part includes an elastic plate that is supported at both ends by the pair of supporting pieces, wherein the elastic plate includes first and second supporting-part contacting regions that are brought into contact with and fixed to the pair of supporting pieces, respectively, a load-beam-part contacting region that is fixed to the load beam part within the concave region, and first and second extending regions that connect the load-beam-part contacting region with the first and second supporting-part contacting regions, respectively, the first and second extending regions being elastically twisted around a load bending center line along the suspension widthwise direction so that the elastic plate functions as the load bending part, wherein the load beam part is formed by a load beam base plate, a portion of the load beam base plate that is positioned on a distal end side from the load bending center line including a parallel region that extends substantially in parallel with the load-beam-part contacting region and directly or indirectly fixed thereto, an intermediate region that extends from the parallel region toward a distal end side of the suspension through a proximal-side bending line along the suspension widthwise direction, and a distal region that extends from the intermediate region toward a distal end side of the suspension through a distal-side bending line along the suspension widthwise direction and that includes a dimple with which the head-mounting region is brought into contact, and wherein the distal-side bending line is positioned in the vicinity of an intermediate point between the load bending center line and the dimple in a suspension lengthwise direction.

2. The magnetic head suspension according to claim 1, wherein the elastic plate is fixed to surfaces of the supporting pieces that are positioned on a side facing the disk surface, and the load beam base plate is fixed to a surface of the elastic plate that is positioned on a side opposite from the disk surface, and wherein the load beam base plate is bent at the proximal-side bending line so that the intermediate region comes closer to the disk surface as a distance to its distal end is reduced with the parallel region as a reference, and is also bent at the distal-side bending line so that the distal region is spaced apart from the disk surface as a distance to its distal end is reduced with the intermediate region as a reference.

3. The magnetic head suspension according to claim 1, further comprising an equilibrating weight part fixed to the load beam base plate in such a manner that at least a part of the equilibrating weight part is positioned within the concave region in planar view.

4. The magnetic head suspension according to claim 1, further comprising an equilibrating weight part fixed to the load beam base plate in such a manner that at least a part of the equilibrating weight part is positioned within the concave region in planar view, wherein the elastic plate is fixed to surfaces of the supporting pieces that are positioned on a side facing the disk surface, the equilibrating weight part is fixed to a surface of the elastic plate that is positioned on a side close to facing the disk surface, and the load beam base plate is fixed to a surface of the equilibrating weight part that is positioned on a side facing the disk surface, and wherein the load beam base plate is bent at the proximal-side bending line so that the intermediate region moves away from the disk surface as a distance to its distal end is reduced with the parallel region as a reference, and is also bent at the distal-side bending line so that the distal region comes closer to the disk surface as a distance to its distal end is reduced with the intermediate region as a reference.

5. The magnetic head suspension according to claim 3, wherein the equilibrating weight part includes a bend portion that is along the suspension width direction, and wherein the equilibrating weight part is bent at the bend portion such that a region that is positioned on a proximal side from the bend portion moves away from the disk surface as a distance to a proximal end is reduced.

6. The magnetic head suspension according to claim 1, wherein the flexure part is formed by a flexure base plate, and the flexure base plate includes a load-beam-part contacting region that is brought into contact with and fixed to the load beam base plate, a pair of supporting pieces that extend toward a distal end side from the load-beam-part contacting region, the head-mounting region which is connected to free ends of the pair of supporting pieces and to which the magnetic head slider is mounted, and a pair of wider regions that extend respectively from the load-beam-part contacting region outwards in the suspension widthwise direction beyond the load beam base plate, and wherein the distal-side bending line and the proximal-side bending line are not overlapped with the pair of the wider regions with respect to positions along the suspension lengthwise direction.

7. The magnetic head suspension according to claim 1, wherein the load beam base plate includes a plate-like main body portion that is symmetrical with the longitudinal center line of the magnetic head suspension as a reference, and flange portions that are arranged at both edges of the main body portion in the suspension widthwise direction, and wherein free ends of the pair of flange portions are formed with notches at the same positions as the distal-side bending line and the proximal-side bending line in the suspension lengthwise direction.

8. The magnetic head suspension according to claim 1, wherein the load beam base plate includes a plate-like main body portion that is symmetrical with the longitudinal center line of the magnetic head suspension as a reference, and flange portions that are arranged at both edges of the main body portion in the suspension widthwise direction, and wherein the load beam base plate is formed with through-holes at the same positions as the distal-side bending line and the proximal-side bending line in the suspension lengthwise direction, the through-holes being across boundaries between the main body portion and the pair of flange portions.

* * * * *